(12) United States Patent
Oguchi

(10) Patent No.: US 9,166,915 B2
(45) Date of Patent: Oct. 20, 2015

(54) COMMUNICATION DEVICE, COMMUNICATION METHOD, AND RECORDING MEDIUM

(71) Applicant: FUJITSU LIMITED, Kawasaki-shi, Kanagawa (JP)

(72) Inventor: Naoki Oguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 121 days.

(21) Appl. No.: 14/023,805

(22) Filed: Sep. 11, 2013

(65) Prior Publication Data

US 2014/0169164 A1 Jun. 19, 2014

(30) Foreign Application Priority Data

Dec. 17, 2012 (JP) .................................. 2012-274590

(51) Int. Cl.
*H04L 12/801* (2013.01)
*H04L 12/807* (2013.01)
*H04L 12/841* (2013.01)
*H04L 12/805* (2013.01)

(52) U.S. Cl.
CPC .............. *H04L 47/193* (2013.01); *H04L 47/27* (2013.01); *H04L 47/283* (2013.01); *H04L 47/365* (2013.01)

(58) Field of Classification Search
None
See application file for complete search history.

(56) References Cited

U.S. PATENT DOCUMENTS

| | | | |
|---|---|---|---|
| 7,839,783 B2 * | 11/2010 | Sivakumar et al. | 370/232 |
| 2001/0015956 A1 * | 8/2001 | Ono | 370/229 |
| 2002/0141448 A1 | 10/2002 | Matsunaga | |
| 2012/0140621 A1 * | 6/2012 | Wu et al. | 370/230 |

FOREIGN PATENT DOCUMENTS

| | | |
|---|---|---|
| JP | 2002-290459 | 10/2002 |
| JP | 2007-194762 | 8/2007 |

* cited by examiner

*Primary Examiner* — Min Jung
(74) *Attorney, Agent, or Firm* — Staas & Halsey LLP

(57) ABSTRACT

A communication device includes a memory configured to store a program, and a processor, based on the program, configured to control a number of communication segments that are allowed to be continuously transmitted after a first communication segment to be transmitted in accordance with a number of acknowledgments that have been received, and set a communication segment length of the first communication segment based on a length of time before completion of reception of an acknowledgment for a transmitted second communication segment.

8 Claims, 17 Drawing Sheets

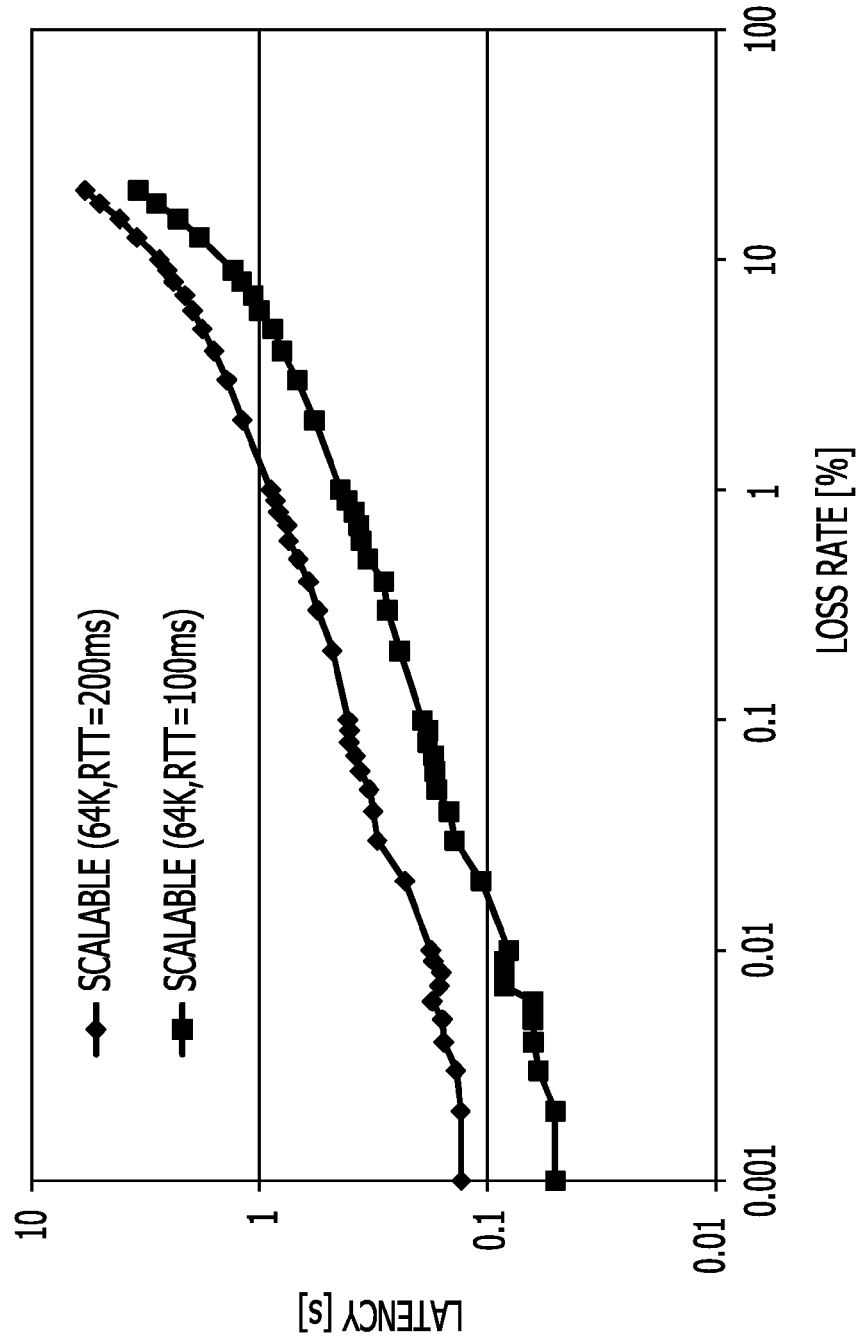

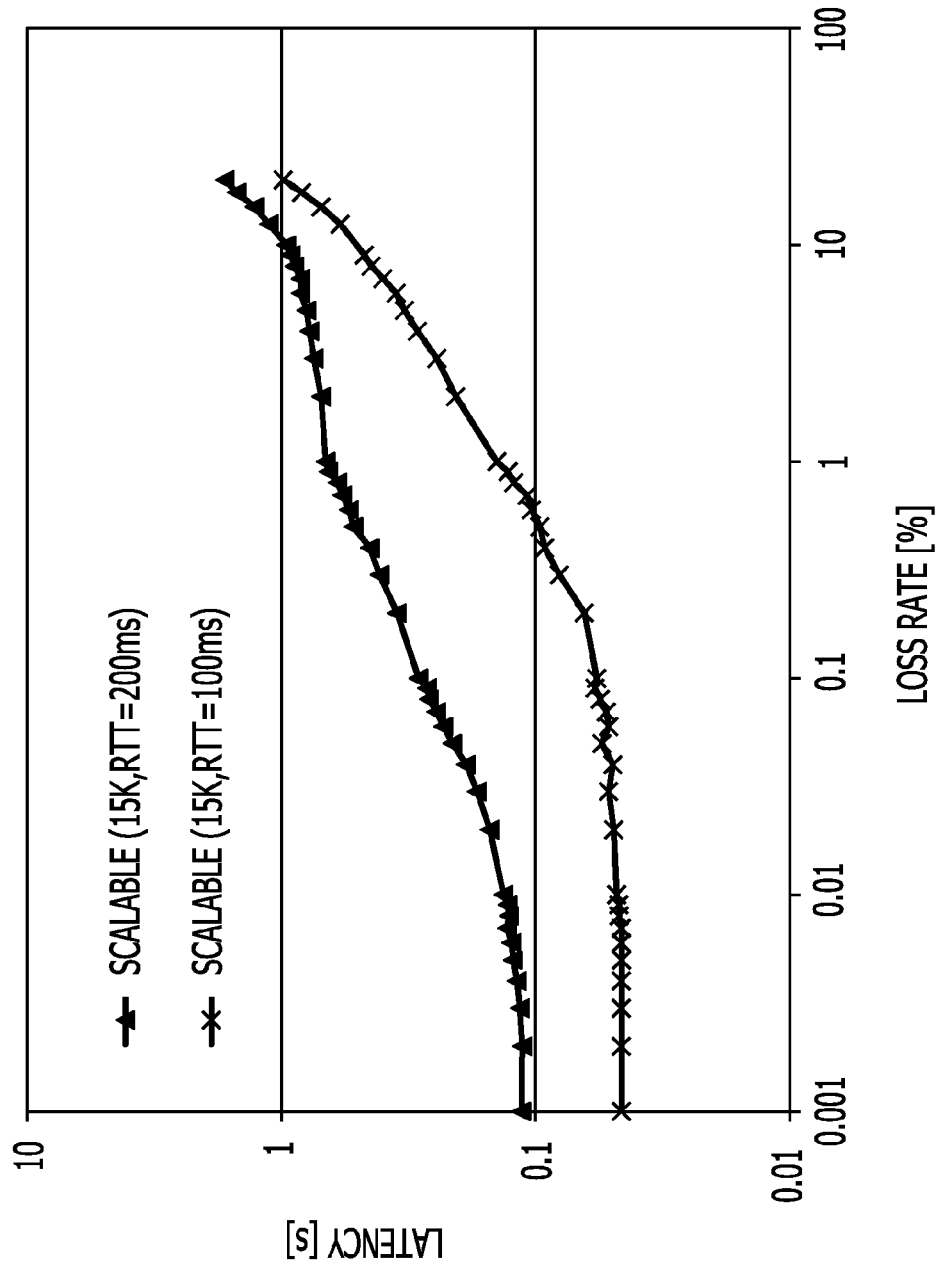

FIG. 9

MSS=1460

RTT=50ms

| | | LOSS RATE | | | | |
|---|---|---|---|---|---|---|
| | | 0.001 | 0.01 | 0.1 | 1 | 10 |
| BURST SIZE | 15KB | 0.02 | 0.021 | 0.025 | 0.071 | 0.25 |
| | 64KB | 0.02 | 0.042 | 0.09 | 0.205 | 0.65 |
| | 1MB | 0.061 | 0.061 | 0.361 | 1.375 | 7.167 |
| | 60MB | 3.65 | 3.65 | 21.65 | 82.5 | 430 |

RTT=100ms

| | | LOSS RATE | | | | |
|---|---|---|---|---|---|---|
| | | 0.001 | 0.01 | 0.1 | 1 | 10 |
| BURST SIZE | 15KB | 0.04 | 0.042 | 0.05 | 0.142 | 0.5 |
| | 64KB | 0.04 | 0.084 | 0.18 | 0.41 | 1.3 |
| | 1MB | 0.122 | 0.122 | 0.722 | 2.75 | 14.33 |
| | 60MB | 7.3 | 7.3 | 43.3 | 165 | 860 |

RTT=150ms

| | | LOSS RATE | | | | |
|---|---|---|---|---|---|---|
| | | 0.001 | 0.01 | 0.1 | 1 | 10 |
| BURST SIZE | 15KB | 0.075 | 0.086 | 0.17 | 0.406 | 0.725 |
| | 64KB | 0.085 | 0.132 | 0.295 | 0.65 | 2.02 |
| | 1MB | 0.256 | 0.571 | 1.661 | 4.875 | 22.17 |
| | 60MB | 15.35 | 34.25 | 99.65 | 292.5 | 1330 |

RTT=200ms

| | | LOSS RATE | | | | |
|---|---|---|---|---|---|---|
| | | 0.001 | 0.01 | 0.1 | 1 | 10 |
| BURST SIZE | 15KB | 0.11 | 0.13 | 0.29 | 0.67 | 0.95 |
| | 64KB | 0.13 | 0.18 | 0.41 | 0.89 | 2.74 |
| | 1MB | 0.39 | 1.02 | 2.6 | 7 | 30 |
| | 60MB | 23.4 | 61.2 | 156 | 420 | 1800 |

MSS=730

RTT=50ms

| | | LOSS RATE | | | | |
|---|---|---|---|---|---|---|
| | | 0.001 | 0.01 | 0.1 | 1 | 10 |
| BURST SIZE | 15KB | 0.015 | 0.016 | 0.019 | 0.055 | 0.193 |
| | 64KB | 0.015 | 0.032 | 0.069 | 0.158 | 0.501 |
| | 1MB | 0.055 | 0.055 | 0.325 | 1.238 | 6.45 |
| | 60MB | 3.285 | 3.285 | 19.49 | 74.25 | 387 |

RTT=100ms

| | | LOSS RATE | | | | |
|---|---|---|---|---|---|---|
| | | 0.001 | 0.01 | 0.1 | 1 | 10 |
| BURST SIZE | 15KB | 0.04 | 0.043 | 0.047 | 0.109 | 0.385 |
| | 64KB | 0.031 | 0.065 | 0.139 | 0.316 | 1.001 |
| | 1MB | 0.11 | 0.11 | 0.65 | 2.475 | 12.9 |
| | 60MB | 6.57 | 6.57 | 38.97 | 148.5 | 774 |

RTT=150ms

| | | LOSS RATE | | | | |
|---|---|---|---|---|---|---|
| | | 0.001 | 0.01 | 0.1 | 1 | 10 |
| BURST SIZE | 15KB | 0.058 | 0.066 | 0.131 | 0.313 | 0.558 |
| | 64KB | 0.065 | 0.102 | 0.227 | 0.501 | 1.555 |
| | 1MB | 0.23 | 0.514 | 1.495 | 4.388 | 19.95 |
| | 60MB | 13.82 | 30.83 | 89.69 | 263.3 | 1197 |

RTT=200ms

| | | LOSS RATE | | | | |
|---|---|---|---|---|---|---|
| | | 0.001 | 0.01 | 0.1 | 1 | 10 |
| BURST SIZE | 15KB | 0.11 | 0.13 | 0.21 | 0.316 | 0.732 |
| | 64KB | 0.1 | 0.139 | 0.316 | 0.685 | 2.11 |
| | 1MB | 0.351 | 0.918 | 2.34 | 6.3 | 27 |
| | 60MB | 21.06 | 55.08 | 140.4 | 378 | 1620 |

MSS=360

RTT=50ms

| | | LOSS RATE | | | | |
|---|---|---|---|---|---|---|
| | | 0.001 | 0.01 | 0.1 | 1 | 10 |
| BURST SIZE | 15KB | 0.011858 | 0.011858 | 0.012451 | 0.014823 | 0.042096 | 0.148225 |
| | 64KB | 0.011858 | 0.024902 | 0.053361 | 0.121545 | 0.385385 |
| | 1MB | 0.049275 | 0.049275 | 0.292275 | 1.11375 | 5.805 |
| | 60MB | 2.9565 | 2.9565 | 17.5365 | 66.825 | 348.3 |

RTT=100ms

| | | LOSS RATE | | | | |
|---|---|---|---|---|---|---|
| | | 0.001 | 0.01 | 0.1 | 1 | 10 |
| BURST SIZE | 15KB | 0.04 | 0.044 | 0.045 | 0.13 | 0.42 |
| | 64KB | 0.023716 | 0.049804 | 0.167222 | 0.243089 | 0.77077 |
| | 1MB | 0.09855 | 0.09855 | 0.58455 | 2.2275 | 11.61 |
| | 60MB | 5.913 | 5.913 | 35.073 | 133.65 | 696.6 |

RTT=150ms

| | | LOSS RATE | | | | |
|---|---|---|---|---|---|---|
| | | 0.001 | 0.01 | 0.1 | 1 | 10 |
| BURST SIZE | 15KB | 0.044468 | 0.050989 | 0.100793 | 0.240717 | 0.429853 |
| | 64KB | 0.050397 | 0.078263 | 0.174906 | 0.385385 | 1.197658 |
| | 1MB | 0.207225 | 0.462375 | 1.345275 | 3.94875 | 17.955 |
| | 60MB | 12.4335 | 27.7425 | 80.7165 | 236.925 | 1077.3 |

RTT=200ms

| | | LOSS RATE | | | | |
|---|---|---|---|---|---|---|
| | | 0.001 | 0.01 | 0.1 | 1 | 10 |
| BURST SIZE | 15KB | 0.077077 | 0.106722 | 0.23 | 0.24332 | 0.86 |
| | 64KB | 0.077077 | 0.106722 | 0.243089 | 0.527681 | 1.624546 |
| | 1MB | 0.3159 | 0.8262 | 2.106 | 5.67 | 24.3 |
| | 60MB | 18.954 | 49.572 | 126.36 | 340.2 | 1458 |

FIG. 11

WHEN AVERAGE BURST SIZE HAS CHANGED FROM 15 KB TO 64 KB (RTT = 100 ms, LOSS RATE 0.1%)

MSS=1460

RTT =50ms

| BURST SIZE | LOSS RATE | | | | |
|---|---|---|---|---|---|
| | | 0.001 | 0.01 | 0.1 | 1 | 10 |
| 15KB | | 0.02 | 0.021 | 0.025 | 0.071 | 0.25 |
| 64KB | | 0.02 | 0.042 | 0.09 | 0.205 | 0.65 |
| 1MB | | 0.061 | 0.061 | 0.361 | 1.375 | 7.167 |
| 60MB | | 3.65 | 3.65 | 21.65 | 82.5 | 430 |

RTT =100ms

| BURST SIZE | LOSS RATE | | | | |
|---|---|---|---|---|---|
| | | 0.001 | 0.01 | 0.1 | 1 | 10 |
| 15KB | | 0.04 | 0.042 | 0.05 | 0.142 | 0.5 |
| 64KB | | 0.04 | 0.084 | 0.18 | 0.41 | 1.3 |
| 1MB | | 0.122 | 0.122 | 0.722 | 2.75 | 14.33 |
| 60MB | | 7.3 | 7.3 | 43.3 | 165 | 860 |

RTT =150ms

| BURST SIZE | LOSS RATE | | | | |
|---|---|---|---|---|---|
| | | 0.001 | 0.01 | 0.1 | 1 | 10 |
| 15KB | | 0.075 | 0.086 | 0.17 | 0.406 | 0.725 |
| 64KB | | 0.085 | 0.132 | 0.295 | 0.65 | 2.02 |
| 1MB | | 0.256 | 0.571 | 1.661 | 4.875 | 22.17 |
| 60MB | | 15.35 | 34.25 | 99.65 | 292.5 | 1330 |

RTT =200ms

| BURST SIZE | LOSS RATE | | | | |
|---|---|---|---|---|---|
| | | 0.001 | 0.01 | 0.1 | 1 | 10 |
| 15KB | | 0.11 | 0.13 | 0.29 | 0.67 | 0.95 |
| 64KB | | 0.13 | 0.18 | 0.41 | 0.89 | 2.74 |
| 1MB | | 0.39 | 1.02 | 2.6 | 7 | 30 |
| 60MB | | 23.4 | 61.2 | 156 | 420 | 1800 |

MSS=730

RTT =50ms

| BURST SIZE | LOSS RATE | | | | |
|---|---|---|---|---|---|
| | | 0.001 | 0.01 | 0.1 | 1 | 10 |
| 15KB | | 0.015 | 0.016 | 0.019 | 0.055 | 0.193 |
| 64KB | | 0.015 | 0.032 | 0.069 | 0.158 | 0.501 |
| 1MB | | 0.055 | 0.055 | 0.325 | 1.238 | 6.45 |
| 60MB | | 3.285 | 3.285 | 19.49 | 74.25 | 387 |

RTT =100ms (LOWEST)

| BURST SIZE | LOSS RATE | | | | |
|---|---|---|---|---|---|
| | | 0.001 | 0.01 | 0.1 | 1 | 10 |
| 15KB | | 0.04 | 0.043 | 0.109 | 0.316 | 1.001 |
| 64KB | | 0.031 | 0.065 | 0.139 | 2.475 | 12.9 |
| 1MB | | 0.11 | 0.11 | | | 774 |
| 60MB | | 6.57 | 6.57 | 148.5 | | |

RTT =150ms

| BURST SIZE | LOSS RATE | | | | |
|---|---|---|---|---|---|
| | | 0.001 | 0.01 | 0.1 | 1 | 10 |
| 15KB | | 0.058 | 0.066 | 0.131 | 0.313 | 0.558 |
| 64KB | | 0.065 | 0.102 | 0.227 | 0.501 | 1.555 |
| 1MB | | 0.23 | 0.514 | 1.495 | 4.388 | 19.95 |
| 60MB | | 13.82 | 30.83 | 89.69 | 263.3 | 1197 |

RTT =200ms

| BURST SIZE | LOSS RATE | | | | |
|---|---|---|---|---|---|
| | | 0.001 | 0.01 | 0.1 | 1 | 10 |
| 15KB | | 0.11 | 0.13 | 0.21 | 0.316 | 0.732 |
| 64KB | | 0.1 | 0.139 | 0.316 | 0.685 | 2.11 |
| 1MB | | 0.351 | 0.918 | 2.34 | 6.3 | 27 |
| 60MB | | 21.06 | 55.08 | 140.4 | 378 | 1620 |

MSS=360

RTT =50ms

| BURST SIZE | LOSS RATE | | | | |
|---|---|---|---|---|---|
| | | 0.001 | 0.01 | 0.1 | 1 | 10 |
| 15KB | | 0.011858 | 0.012451 | 0.014823 | 0.042096 | 0.148225 |
| 64KB | | 0.011858 | 0.024902 | 0.053361 | 0.121545 | 0.385385 |
| 1MB | | 0.049275 | 0.049275 | 0.292275 | 1.11375 | 5.805 |
| 60MB | | 2.9565 | 2.95 | | 6.825 | 348.3 |

RTT =100ms (LOWEST)

| BURST SIZE | LOSS RATE | | | | |
|---|---|---|---|---|---|
| | | 0.001 | 0.01 | 0.1 | 1 | 10 |
| 15KB | | 0.04 | 0.044 | 0.045 | 0.13 | 0.42 |
| 64KB | | 0.023716 | 0.049804 | 0.16722 | 0.243089 | 0.77077 |
| 1MB | | 0.09855 | 0.09855 | 0.58455 | 2.2275 | 11.61 |
| 60MB | | 5.913 | 5.913 | 35.073 | 133.65 | 696.6 |

RTT =150ms

| BURST SIZE | LOSS RATE | | | | |
|---|---|---|---|---|---|
| | | 0.001 | 0.01 | 0.1 | 1 | 10 |
| 15KB | | 0.044468 | 0.050989 | 0.100793 | 0.240717 | 0.429853 |
| 64KB | | 0.050397 | 0.078263 | 0.174906 | 0.385385 | 1.197658 |
| 1MB | | 0.207225 | 0.462375 | 1.345275 | 3.94875 | 17.955 |
| 60MB | | 12.4335 | 27.7425 | 80.7165 | 236.925 | 1077.3 |

RTT =200ms

| BURST SIZE | LOSS RATE | | | | |
|---|---|---|---|---|---|
| | | 0.001 | 0.01 | 0.1 | 1 | 10 |
| 15KB | | 0.11 | 0.13 | 0.23 | 0.24332 | 0.86 |
| 64KB | | 0.077077 | 0.106722 | 0.243089 | 0.527681 | 1.624546 |
| 1MB | | 0.3159 | 0.8262 | 2.106 | 5.67 | 24.3 |
| 60MB | | 18.954 | 49.572 | 126.36 | 340.2 | 1458 |

FIG. 12

WHEN LOSS RATE HAS CHANGED FROM 1% TO 0.01%
(RTT = 100 ms, AVERAGE BURST SIZE = 15 KB)

MSS=1460

| RTT | | BURST SIZE | LOSS RATE | | | | |
|---|---|---|---|---|---|---|---|
| | | | | 0.001 | 0.01 | 0.1 | 1 | 10 |
| =50ms | BURST SIZE | 15KB | 0.02 | 0.021 | 0.025 | 0.071 | 0.25 |
| | | 64KB | 0.02 | 0.042 | 0.09 | 0.205 | 0.65 |
| | | 1MB | 0.061 | 0.061 | 0.361 | 1.375 | 7.167 |
| | | 60MB | 3.65 | 82.5 | 430 |
| =100ms | BURST SIZE | 15KB | 0.04 | 0.042 (LOWEST) | 0.05 | 0.142 | 0.5 |
| | | 64KB | 0.04 | 0.084 | 0.18 | 0.41 | 1.3 |
| | | 1MB | 0.122 | 0.122 | 0.722 | 2.75 | 14.33 |
| | | 60MB | 7.3 | 7.3 | 43.3 | 165 | 860 |
| =150ms | BURST SIZE | 15KB | 0.075 | 0.086 | 0.17 | 0.406 | 0.725 |
| | | 64KB | 0.085 | 0.132 | 0.295 | 0.65 | 2.02 |
| | | 1MB | 0.256 | 0.571 | 1.661 | 4.875 | 22.17 |
| | | 60MB | 15.35 | 34.25 | 99.65 | 292.5 | 1330 |
| =200ms | BURST SIZE | 15KB | 0.11 | 0.13 | 0.29 | 0.67 | 0.95 |
| | | 64KB | 0.13 | 0.18 | 0.41 | 0.89 | 2.74 |
| | | 1MB | 0.39 | 1.02 | 2.6 | 7 | 30 |
| | | 60MB | 23.4 | 61.2 | 156 | 420 | 1800 |

MSS=730

| RTT | | BURST SIZE | LOSS RATE | | | | |
|---|---|---|---|---|---|---|---|
| | | | 0.001 | 0.01 | 0.1 | 1 | 10 |
| =50ms | BURST SIZE | 15KB | 0.015 | 0.016 | 0.019 | 0.055 | 0.193 |
| | | 64KB | 0.015 | 0.032 | 0.069 | 0.158 | 0.501 |
| | | 1MB | 0.055 | 0.055 | 0.325 | 1.238 | 6.45 |
| | | 60MB | 3.285 | 3.285 | 17.5365 | 66.825 | 387 |
| =100ms | BURST SIZE | 15KB | 0.04 | 0.043 | 0.047 | 0.109 (LOWEST) | 0.385 |
| | | 64KB | 0.031 | 0.065 | 0.139 | 0.316 | 1.001 |
| | | 1MB | 0.11 | 0.11 | 0.65 | 2.475 | 12.9 |
| | | 60MB | 6.57 | 6.57 | 38.97 | 148.5 | 774 |
| =150ms | BURST SIZE | 15KB | 0.058 | 0.066 | 0.102 | 0.313 | 0.558 |
| | | 64KB | 0.065 | 0.102 | 0.227 | 0.501 | 1.555 |
| | | 1MB | 0.23 | 0.514 | 1.495 | 4.388 | 19.95 |
| | | 60MB | 13.82 | 30.83 | 89.69 | 263.3 | 1197 |
| =200ms | BURST SIZE | 15KB | 0.11 | 0.13 | 0.21 | 0.316 | 0.732 |
| | | 64KB | 0.1 | 0.139 | 0.316 | 0.685 | 2.11 |
| | | 1MB | 0.351 | 0.918 | 1.495 | 6.3 | 27 |
| | | 60MB | 21.06 | 55.08 | 140.4 | 378 | 1620 |

MSS=360

| RTT | | BURST SIZE | LOSS RATE | | | | |
|---|---|---|---|---|---|---|---|
| | | | 0.001 | 0.01 | 0.1 | 1 | 10 |
| =50ms | BURST SIZE | 15KB | 0.011858 | 0.012451 | 0.014823 | 0.042096 | 0.148225 |
| | | 64KB | 0.011858 | 0.024902 | 0.053361 | 0.121545 | 0.385385 |
| | | 1MB | 0.049275 | 0.049275 | 0.292275 | 1.11375 | 5.805 |
| | | 60MB | 2.9565 | 2.9565 | 17.5365 | 66.825 | 348.3 |
| =100ms | BURST SIZE | 15KB | 0.04 | 0.044 | 0.045 | 0.13 | 0.42 |
| | | 64KB | 0.023716 | 0.049804 | 0.167221 | 0.243089 | 0.77077 |
| | | 1MB | 0.09855 | 0.09855 | 0.58455 | 2.2275 | 11.61 |
| | | 60MB | 5.913 | 5.913 | 35.073 | 133.65 | 696.6 |
| =150ms | BURST SIZE | 15KB | 0.044468 | 0.050989 | 0.100793 | 0.240717 | 0.429853 |
| | | 64KB | 0.050397 | 0.078263 | 0.174906 | 0.385385 | 1.197658 |
| | | 1MB | 0.207225 | 0.462375 | 1.345275 | 3.94875 | 17.955 |
| | | 60MB | 12.4335 | 27.7425 | 80.7165 | 236.925 | 1077.3 |
| =200ms | BURST SIZE | 15KB | 0.11 | 0.13 | 0.23 | 0.24332 | 0.86 |
| | | 64KB | 0.077077 | 0.106722 | 0.243089 | 0.527681 | 1.624546 |
| | | 1MB | 0.3159 | 0.8262 | 2.106 | 5.67 | 24.3 |
| | | 60MB | 18.954 | 49.572 | 126.36 | 340.2 | 1458 |

FIG. 13

WHEN RTT HAS CHANGED FROM 100 ms TO 200 ms
(LOSS RATE 0.1%, AVERAGE BURST SIZE = 15 KB)

| | | | MSS=1460 | | | | | | MSS=730 | | | | | | MSS=360 | | | |
|---|---|---|---|---|---|---|---|---|---|---|---|---|---|---|---|---|---|---|
| | | | LOSS RATE | | | | | | LOSS RATE | | | | | | LOSS RATE | | | |
| | | | 0.001 | 0.01 | 0.1 | 1 | 10 | | 0.001 | 0.01 | 0.1 | 1 | 10 | | 0.001 | 0.01 | 0.1 | 1 | 10 |
| RTT =50ms | BURST SIZE | 15KB | 0.02 | 0.021 | 0.025 | 0.071 | 0.25 | 15KB | 0.015 | 0.016 | 0.019 | 0.055 | 0.193 | 15KB | 0.011858 | 0.012451 | 0.014823 | 0.042096 | 0.148225 |
| | | 64KB | 0.02 | 0.042 | 0.09 | 0.205 | 0.65 | 64KB | 0.015 | 0.032 | 0.069 | 0.158 | 0.501 | 64KB | 0.011858 | 0.024902 | 0.053361 | 0.121545 | 0.385385 |
| | | 1MB | 0.061 | 0.061 | 0.361 | 1.375 | 7.167 | 1MB | 0.055 | 0.055 | 0.325 | 1.238 | 6.45 | 1MB | 0.049275 | 0.049275 | 0.292275 | 1.11375 | 5.805 |
| | | 60MB | 3.65 | 3.65 | 21.65 | 82.5 | 430 | 60MB | 3.285 | 3.285 | 19.49 | 74.25 | 387 | 60MB | 2.9565 | 2.95 | 19.49 | 66.825 | 348.3 |
| | | | LOSS RATE | | | | | | LOSS RATE | | | | | | LOSS RATE | | | |
| | | | 0.001 | 0.01 | 0.1 | 1 | 10 | | 0.001 | 0.01 | 0.1 | 1 | 10 | | 0.001 | 0.01 | 0.1 | 1 | 10 |
| RTT =100ms | BURST SIZE | 15KB | 0.04 | 0.042 | 0.05 | 0.142 | 0.5 | 15KB | 0.04 | 0.043 | 0.047 | 0.109 | 0.385 | 15KB | 0.04 | 0.044 | 0.045 | 0.13 | 0.42 |
| | | 64KB | 0.04 | 0.084 | 0.18 | 0.41 | 1.3 | 64KB | 0.031 | 0.065 | 0.139 | 0.316 | 1.001 | 64KB | 0.023716 | 0.049804 | 0.167220 | 0.243089 | 0.77077 |
| | | 1MB | 0.122 | 0.122 | 0.722 | 2.75 | 14.33 | 1MB | 0.11 | 0.11 | 0.65 | 2.475 | 12.9 | 1MB | 0.09855 | 0.09855 | 0.58455 | 2.2275 | 11.61 |
| | | 60MB | 7.3 | 7.3 | 43.3 | 165 | 860 | 60MB | 6.57 | 6.57 | 38.97 | 148.5 | 774 | 60MB | 5.913 | 5.913 | 35.073 | 133.65 | 696.6 |
| | | | LOSS RATE | | | | | | LOSS RATE | | | | | | LOSS RATE | | | |
| | | | 0.001 | 0.01 | 0.1 | 1 | 10 | | 0.001 | 0.01 | 0.1 | 1 | 10 | | 0.001 | 0.01 | 0.1 | 1 | 10 |
| RTT =150ms | BURST SIZE | 15KB | 0.075 | 0.086 | 0.17 | 0.406 | 0.725 | 15KB | 0.058 | 0.066 | 0.131 | 0.313 | 0.558 | 15KB | 0.044468 | 0.050989 | 0.100793 | 0.240717 | 0.429853 |
| | | 64KB | 0.085 | 0.132 | 0.295 | 0.65 | 2.02 | 64KB | 0.065 | 0.102 | 0.227 | 0.501 | 1.555 | 64KB | 0.050397 | 0.078263 | 0.174906 | 0.385385 | 1.197658 |
| | | 1MB | 0.256 | 0.571 | 1.661 | 4.875 | 22.17 | 1MB | 0.23 | 0.514 | 1.495 | 4.388 | 19.95 | 1MB | 0.207225 | 0.462375 | 1.345275 | 3.94875 | 17.955 |
| | | 60MB | 15.35 | 34.25 | 99.65 | 292.5 | 1330 | 60MB | 13.82 | 30.83 | 89.7 | 263.3 | 1197 | 60MB | 12.4335 | 27.7425 | 80.7165 | 236.925 | 1077.3 |
| | | | LOSS RATE | | | | | | LOSS RATE | | | | | | LOSS RATE | | | |
| | | | 0.001 | 0.01 | 0.1 | 1 | 10 | | 0.001 | 0.01 | 0.1 | 1 | 10 | | 0.001 | 0.01 | 0.1 | 1 | 10 |
| RTT =200ms | BURST SIZE | 15KB | 0.11 | 0.13 | 0.29 | 0.67 | 0.95 | 15KB | 0.11 | 0.13 | 0.21 | 0.316 | 0.732 | 15KB | 0.077077 | 0.106722 | 0.23 | 0.24332 | 0.86 |
| | | 64KB | 0.13 | 0.18 | 0.41 | 0.89 | 2.74 | 64KB | 0.1 | 0.139 | 0.316 | 0.685 | 2.11 | 64KB | 0.077077 | 0.243089 | 0.243089 | 0.527681 | 1.624546 |
| | | 1MB | 0.39 | 1.02 | 2.6 | 7 | 30 | 1MB | 0.351 | 0.918 | 2.34 | 6.3 | 27 | 1MB | 0.3159 | 0.8262 | 2.106 | 5.67 | 24.3 |
| | | 60MB | 23.4 | 61.2 | 156 | 420 | 1800 | 60MB | 21.06 | 55.08 | 140.4 | 378 | 1620 | 60MB | 18.954 | 49.572 | 126.36 | 340.2 | 1458 |

COMMUNICATION DEVICE, COMMUNICATION METHOD, AND RECORDING MEDIUM

CROSS-REFERENCE TO RELATED APPLICATION

This application is based upon and claims the benefit of priority of the prior Japanese Patent Application No. 2012-274590, filed on Dec. 17, 2012, the entire contents of which are incorporated herein by reference.

FIELD

The embodiment discussed herein is related to a communication device, a communication methods and a recording media.

BACKGROUND

The transmission control protocol (TCP) is a connection-oriented protocol. In TCP, to ensure reachability of data, a reception node transmits an acknowledgment (ACK) to a transmission node when receiving a segment.

Moreover, in TCP, a window is adopted, and the transmission node is allowed to transmit TCP segments continuously without receiving an ACK until the number of TCP segments reaches a window size. That is, the window size is the number of segments that are allowed to be transmitted from the time when one segment is transmitted until when an ACK for the segment is received. The time from when one segment is transmitted until when an ACK for the segment is received corresponds to the round trip time (RTT).

If the transmission node transmits the predetermined number of segments suddenly, this may lead to congestion on a network. Therefore, in TCP, as a mechanism of congestion control, mechanisms called slow start and congestion avoidance mode are adopted. Slow start is a method by which gradual transmission of segments is started, and, when an ACK is returned, the number of segments to be transmitted (a window size) is increased.

Furthermore, after the window size is increased to a value greater than or equal to a value called a slow start threshold value, the window size is enlarged as the congestion avoidance mode. Therefore, in these congestion control, at first the window size is small and gradually increases. Moreover, if packet loss occurs or an ACK is not returned within a time-out period, in TCP, the window size temporarily defaults to 2 which is an initial value, and the number of segments to be transmitted is reduced. Thereafter, the window size is gradually increased again in slow start. Moreover, though not timed out, when slight congestion is detected, the window size is reduced to a given size. In this case, the window size is enlarged every time an ACK is received in accordance with slow start if the window size is smaller than the slow start threshold value or in accordance with the congestion avoidance mode if the window size is greater than the slow start threshold value.

FIG. 1 is a diagram depicting an example of a change in a window size of communication using TCP. In FIG. 1, an example of a change in a window size when the RTT is 100 ms and the loss rate is 0.01% is depicted. In FIG. 1, a solid line indicates the size of a congestion window (in FIG. 1, "cwnd") and a dashed line indicates a slow start threshold value (in FIG. 1, "ssthresh"). The congestion window is a window used in slow start or the congestion avoidance mode. In FIG. 1, the occurrence of packet loss is indicated at vertices of the solid graph, and a case in which the congestion window size is reduced to 2 due to the occurrence of packet loss is depicted.

As described above, in TCP, when the window size is reduced to 2 due to the occurrence of packet loss, it takes time for the window size to return to a predetermined window size because of slow start. The communication throughput depends on the window size, that is, the number of segments that are allowed to be transmitted per RTT. Therefore, when TCP communication is performed over a line with a long RTT, if packet loss occurs, there is a high possibility that the communication throughput is decreased.

One of the lines with a long RTT is a wide area network (WAN). When communication is performed via the WAN, a device called a WAN optimization device is sometimes used. The WAN optimization device performs communication by, for example, replacing normal TCP used by a terminal device with TCP with a higher line utilization ratio to suppress a decrease in an average throughput of TCP. Hereinafter, TCP with a higher line utilization ratio is referred to as optimized TCP. The WAN optimization devices are disposed in such a way as to sandwich a WAN line between a server and a terminal device, for example. The WAN optimization device temporarily terminates a TCP session between the WAN optimization device and the terminal device or the server, replaces the TCP session with a session of optimized TCP, and performs transmission to another WAN optimization device which the WAN optimization device faces with the WAN placed therebetween. The other WAN optimization device which the WAN optimization device faces returns optimized TCP to normal TCP used between the WAN optimization device and the terminal or the server.

High-speed communication protocols used between the WAN optimization devices vary among vendors. For example, there are a protocol obtained by improving the user datagram protocol (UDP) and adding retransmission control and a congestion control function thereto and a protocol obtained by improving existing TCP to make the congestion control function thereof more efficient. As a UDP based high-speed communication protocol, there is a protocol called UDP based data transfer (UDT), for example. As a protocol obtained by improving TCP, that is, as optimized TCP, there are algorithms such as CUBIC and Scalable.

There are the following two types of congestion window control algorithms of these optimized communication protocols:

(1) an algorithm that enlarges a congestion window in accordance with the number of ACKs; and (2) an algorithm that enlarges a congestion window in accordance with the length of time that has elapsed after the detection of congestion.

Examples of type (1) include Scalable, and examples of type (2) include CUBIC.

Transmitting a large amount of data without leaving an interval greater than or equal to a predetermined packet interval between transmissions is referred to as bulk transfer. Here, an example of a predetermined packet interval is a retransmission time out (RTO) which is a waiting time before the start of retransmission in TCP. On the other hand, transmitting a packet group generated from one piece of data with an interval greater than or equal to a predetermined interval left between transmissions is referred to as burst transmission. The data from which the packet group to be transmitted by burst transmission is generated is referred to as burst data. An example of an application that performs burst transmission is remote desktop.

The high-speed communication protocol is optimized mainly for the purpose of speeding up bulk transfer. For example, optimized TCP used between the WAN optimization devices is generally configured in such a way that an average throughput becomes maximum when bulk transfer is performed.

Japanese Laid-open Patent Publication No. 2007-194762 and Japanese Laid-open Patent Publication No. 2002-290459 are examples of related art.

SUMMARY

According to an aspect of the invention, a communication device includes a memory configured to store a program, and a processor, based on the program, configured to control a number of communication segments that are allowed to be continuously transmitted after a first communication segment to be transmitted in accordance with a number of acknowledgments that have been received, and set a communication segment length of the first communication segment based on a length of time before completion of reception of an acknowledgment for a transmitted second communication segment.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 depicts an example of the relationship between the loss rate and latency when two-way communication is performed by using TCP Scalable and the burst size is 64 Kbytes;

FIG. 8 depicts an example of the relationship between the loss rate and latency when two-way communication is performed by using TCP Scalable and the burst size is 15 Kbytes;

FIG. 9 depicts an example of a latency estimation table;

FIG. 11 depicts an example of use of the latency estimation table when an average burst size has changed;

FIG. 12 depicts an example of use of the latency estimation table when a loss rate has changed;

FIG. 13 depicts an example of use of the latency estimation table when the RTT has changed;

DESCRIPTION OF EMBODIMENT

The study conducted by the inventor reveals that, in burst transmission, when the amount of data to be transmitted is small, the number of segments is also small and the number of ACKs is accordingly small. Therefore, in burst transmission, with the algorithm described in (1), the algorithm that enlarges a congestion window in accordance with the number of ACKs, the congestion window size is not increased as intended, and an expected throughput is not necessarily obtained.

Moreover, many applications that perform burst transmission ask a server to perform high-response two-way communication. High-response means low transfer latency for burst data transmission. The transfer latency here refers to the time from when burst data is transmitted until when an ACK is received. The transfer latency is reduced with an increase in the throughput.

According to an embodiment which will be described later, in communication using a communication protocol by which the window size is controlled in accordance with the number of acknowledgments, it is possible to make a response of two-way communication quicker.

Hereinafter, the embodiment will be described based on the drawings. It is to be understood that the configuration of the following embodiment is a mere example and the configuration is not limited to the configuration of the embodiment.

Embodiment

Figure 1:
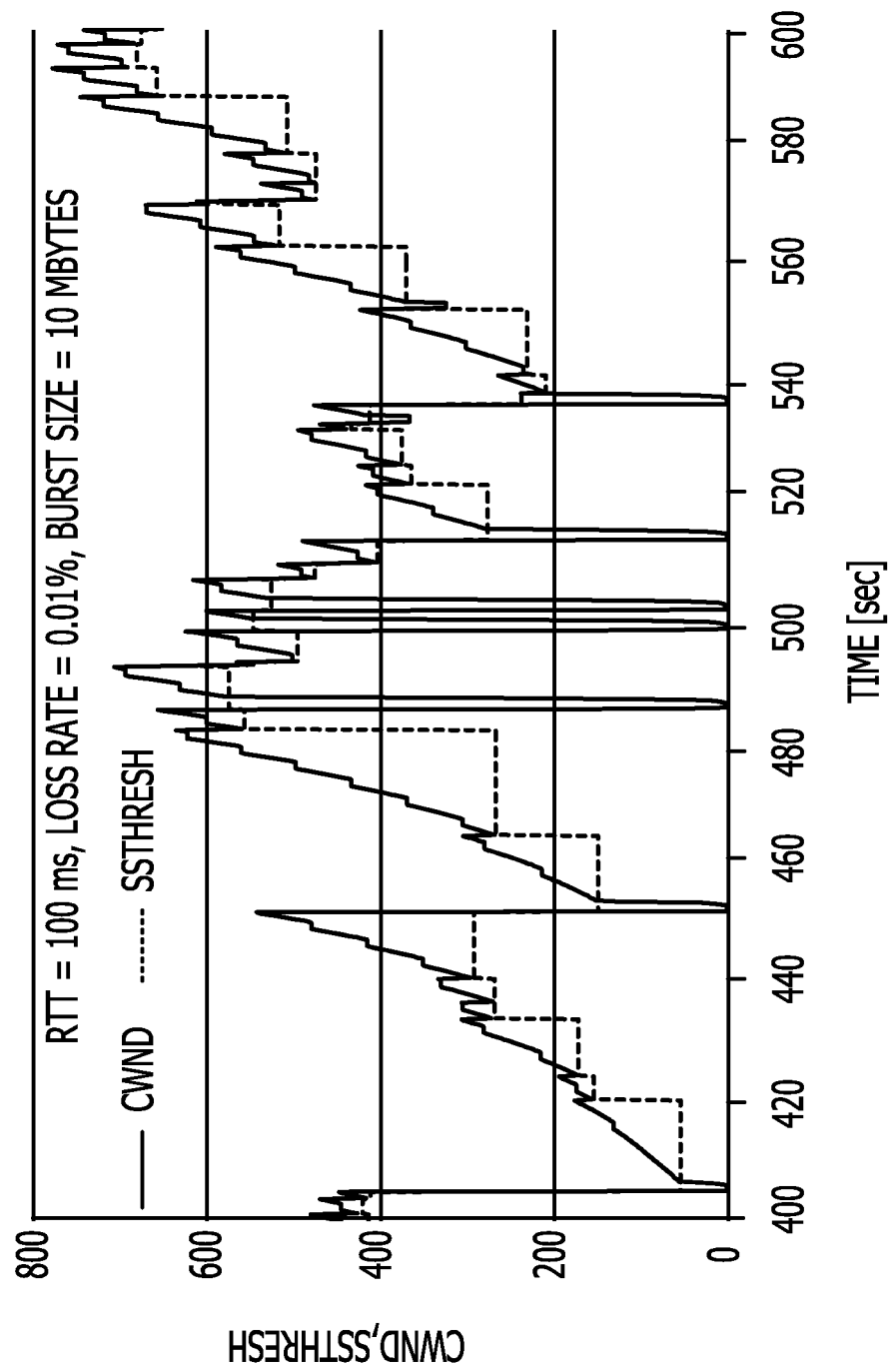
FIG. 1 depicts an example of a change in a window size of communication using TCP.
Figure 2:
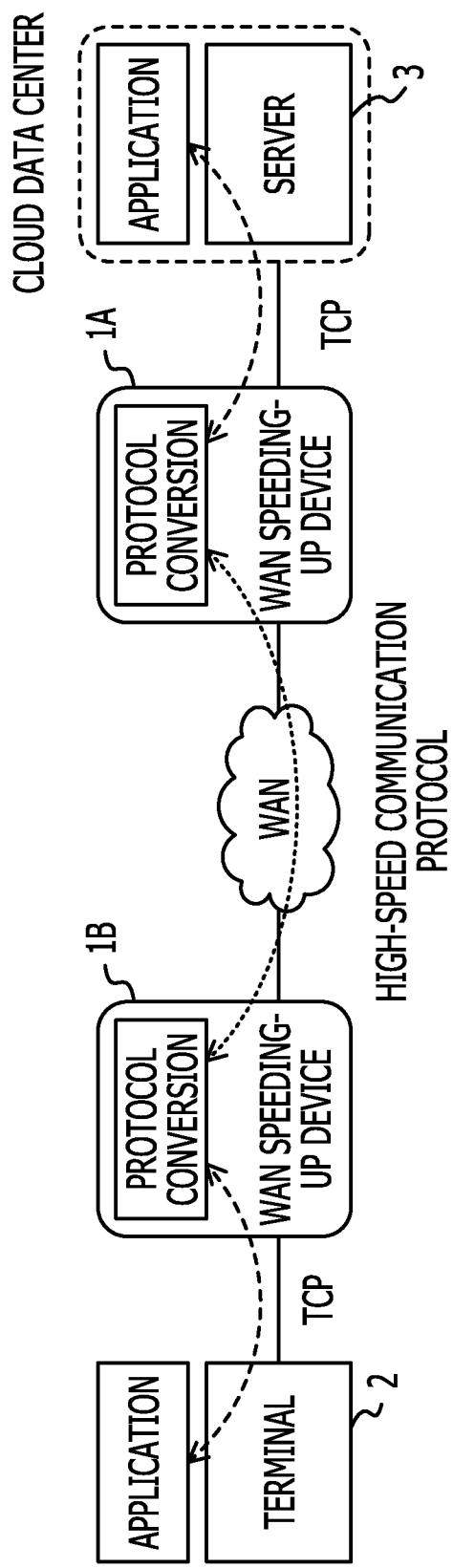
FIG. 2 depicts a configuration example of a network system of an embodiment.

FIG. 2 is a diagram depicting a configuration example of a network system of the embodiment. The network system includes a WAN optimization device 1A, a WAN optimization device 1B, a terminal device 2, and a server 3. The terminal device 2 is, for example, a device such as a mobile telephone, a smartphone, a tablet, or a personal computer. The terminal device 2 is connected to the WAN optimization device 1B by a wireless or wired network. The server 3 is a server in a cloud data center, for example, and is connected to the WAN optimization device 1A. In the network system, the terminal device 2 performs TCP communication with the server 3 through a WAN line.

The WAN optimization device 1A and the WAN optimization device 1B are connected to a WAN and perform communication by using a high-speed communication protocol. The WAN is a wired or wireless network. The high-speed communication protocol used between the WAN optimization device 1A and the WAN optimization device 1B is a protocol that adopts an algorithm by which a congestion window is enlarged in accordance with the number of ACKs. In the embodiment, it is assumed that TCP Scalable is used between the WAN optimization device 1A and the WAN optimization device 1B as the high-speed communication protocol. It is assumed that normal TCP, for example, TCP Reno is used between the WAN optimization device 1A and the server 3 and between the WAN optimization device 1B and the terminal device 2. Hereinafter, normal TCP is also written as "standard TCP".

The WAN optimization device 1A and the WAN optimization device 1B perform replacement of a session of normal TCP with a session of the high-speed communication protocol. Hereinafter, replacement of a session of normal TCP with a session of the high-speed communication protocol is referred to as "protocol conversion". Moreover, hereinafter, the WAN optimization device 1A and the WAN optimization device 1B are written as a WAN optimization device 1 unless the WAN optimization devices 1A and 1B are distinguished from one another.

Here, the congestion window control algorithm of (1) described above, the congestion window control algorithm by which a congestion window is enlarged in accordance with the number of ACKs, is as follows.

$$W = W + \alpha \text{ for every } ACK \tag{1}$$

$$\frac{dW}{da} = \alpha \tag{2}$$

$$\frac{da}{dt} = \begin{cases} \dfrac{W}{T} & \ldots \text{ at the time of bulk transfer} \\ \mu & \ldots \text{ at the time of burst transmission} \end{cases} \tag{3}$$

$$\frac{dW}{dt} = \frac{dW}{da}\frac{da}{dt} \tag{4}$$
$$= \begin{cases} \alpha\dfrac{W}{T} & \ldots \text{ at the time of bulk transfer} \\ \alpha\mu & \ldots \text{ at the time of burst transmission} \end{cases}$$

W: congestion window size
T: round-trip delay time (RTT)
μ: average packet transmission rate
α: rise coefficient
a: the number of ACKs Here, W represents a congestion window size, T represents a round-trip delay time (RTT), μ represents an average packet transmission rate, which is the rate at which an application transmits a packet, and α represents a rise coefficient and is a constant 0<α<1. In TCP Scalable, α=0.01. In addition, a represents the number of ACKs.

Expression (1) indicates that the congestion window size is increased by α for one ACK. Expression (2) indicates that an increase of the congestion window size for one ACK is α. Expression (3) indicates the number of ACKs received per unit time (ACK reception rate). The ACK reception rate is equal to the rate at which a segment is transmitted at the time of bulk transfer, and ACKs corresponding to the window size are received per RTT. On the other hand, at the time of burst transmission, even when the window size is a sufficient size, the ACK reception rate is limited to an average packet transmission rate.

From expressions (2) and (3), expression (4) indicating an increase of the congestion window per unit time is derived. At the time of burst transmission, if the amount of transmitted data is small, since the number of transmitted segments is small, the number of received ACKs is also small. Therefore, expression (4) indicates that, at the time of burst transmission, the congestion window size is increased only at an average packet transmission rate μ. Thus, it is indicated that, for example, when the average packet transmission rate μ is a small value, the rate of increase of the congestion window size is reduced. Incidentally, since a packet is a segment to which a TCP/IP header is attached, the number of segments generated from certain transmitted data is equal to the number of packets generated from the same transmitted data.

Therefore, in the embodiment, at the time of burst transmission, the WAN optimization device 1 increases the number of received ACKs by reducing the maximum length of a TCP segment, that is, the MSS and increasing the number of transmitted segments. An increase in the number of ACKs increases the value of the average packet transmission rate μ (see expression (3)), whereby the congestion window is enlarged more quickly. As a result of the congestion window size being increased more quickly, an average window size is increased, whereby the throughput is increased. An increase in the throughput also makes a response in two-way communication quicker.

In the embodiment, the time from when the first segment of burst data is transmitted until when an ACK for the last segment is received at the time of burst transmission is referred to as latency. Since the lower the latency, the quicker a response, the WAN optimization device 1 controls the MSS in such a way that the latency becomes lower. Incidentally, to suppress a rise in latency, the embodiment assumes that the Nagle algorithm of TCP is not valid. The Nagle algorithm of TCP is the function of waiting until a TCP stack of an OS becomes a rather large amount of data when a communication application asks the TCP stack of the OS to transmit a plurality of pieces of short data.

Figure 3:
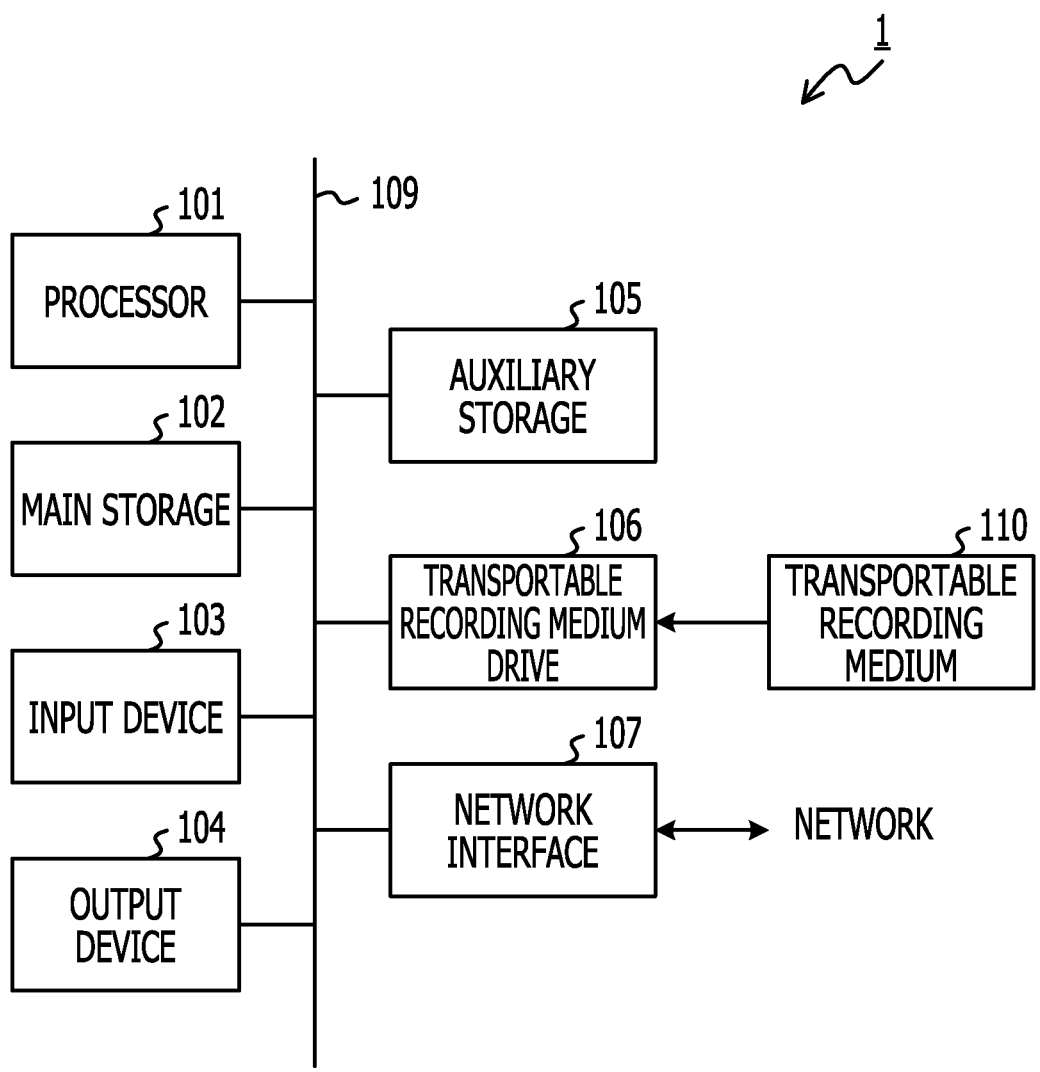
FIG. 3 depicts an example of a hardware configuration of a WAN optimization device.

FIG. 3 is a diagram depicting an example of a hardware configuration of the WAN optimization device 1. The WAN optimization device 1 is, for example, a dedicated computer as a server or a general-purpose computer. In the embodiment, the WAN optimization device 1 is assumed to be a computer that operates as a proxy of TCP.

The WAN optimization device 1 includes a processor 101, a main storage 102, an input device 103, an output device 104, an auxiliary storage 105, a transportable recording medium drive 106, and a network interface 107. These component elements are connected to one another by a bus 109.

The input device 103 is, for example, a touch panel, a keyboard, or the like. The data input from the input device 103 is output to the processor 101.

The transportable recording medium drive 106 reads a program and various data recorded on a transportable recording medium 110 and outputs the read program and data to the processor 101. The transportable recording medium 110 is a recording medium such as an SD card, a mini SD card, a micro SD card, a universal serial bus (USB) flash memory, a compact disc (CD), a digital versatile disc (DVD), a Blu-ray disc, or a flash memory card.

The network interface 107 is an interface that performs input and output of information with a network. The network interface 107 is connected to a wired network and a wireless network. The network interface 107 is, for example, a network interface card (NIC), a wireless local area network (LAN) card, or the like. The data and so forth received by the network interface 107 is output to the processor 101.

The auxiliary storage 105 stores various programs and data used by the processor 101 at the time of execution of each program. The auxiliary storage 105 is, for example, a non-volatile memory such as an erasable programmable ROM (EPROM), a hard disc drive, or the like. The auxiliary storage 105 holds, for example, an operating system (OS), a communication program, and other various application programs.

The main storage 102 provides the processor 101 with a storage area and a working area into which the program stored in the auxiliary storage 105 is loaded, and the main storage 102 is used as a buffer. The main storage 102 is, for example, a semiconductor memory such as a random access memory (RAM).

The processor 101 is, for example, a central processing unit (CPU). The processor 101 performs various processing by loading the OS and the various application programs held in the auxiliary storage 105 or the transportable recording medium 110 into the main storage 102 and executing the OS and the various application programs. The number of processors 101 is not limited to one, and there may be a plurality of processors 101.

The output device 104 outputs the result of processing of the processor 101. The output device 104 includes an audio output device such as a speaker, a display, and a printer.

For example, in the WAN optimization device 1, the processor 101 loads the communication program held in the auxiliary storage 105 into the main storage 102 and executes the communication program. The WAN optimization device 1 measures a predetermined communication indicator by the execution of the communication program. When there is a change in the measured value of the communication indicator, the WAN optimization device 1 estimates the amount of delay (latency) based on the measured value of the communication indicator. The WAN optimization device 1 sets the MSS in accordance with the estimated amount of delay. Incidentally, the hardware configuration of the WAN optimization device 1 is an example and is not limited to the above-described hardware configuration. Any component element may be omitted and replaced with another component element as appropriate in accordance with an embodiment, and another component element may be added as appropriate in accordance with an embodiment. The communication program may be recorded, for example, on the transportable recording medium 110.

Figure 4:
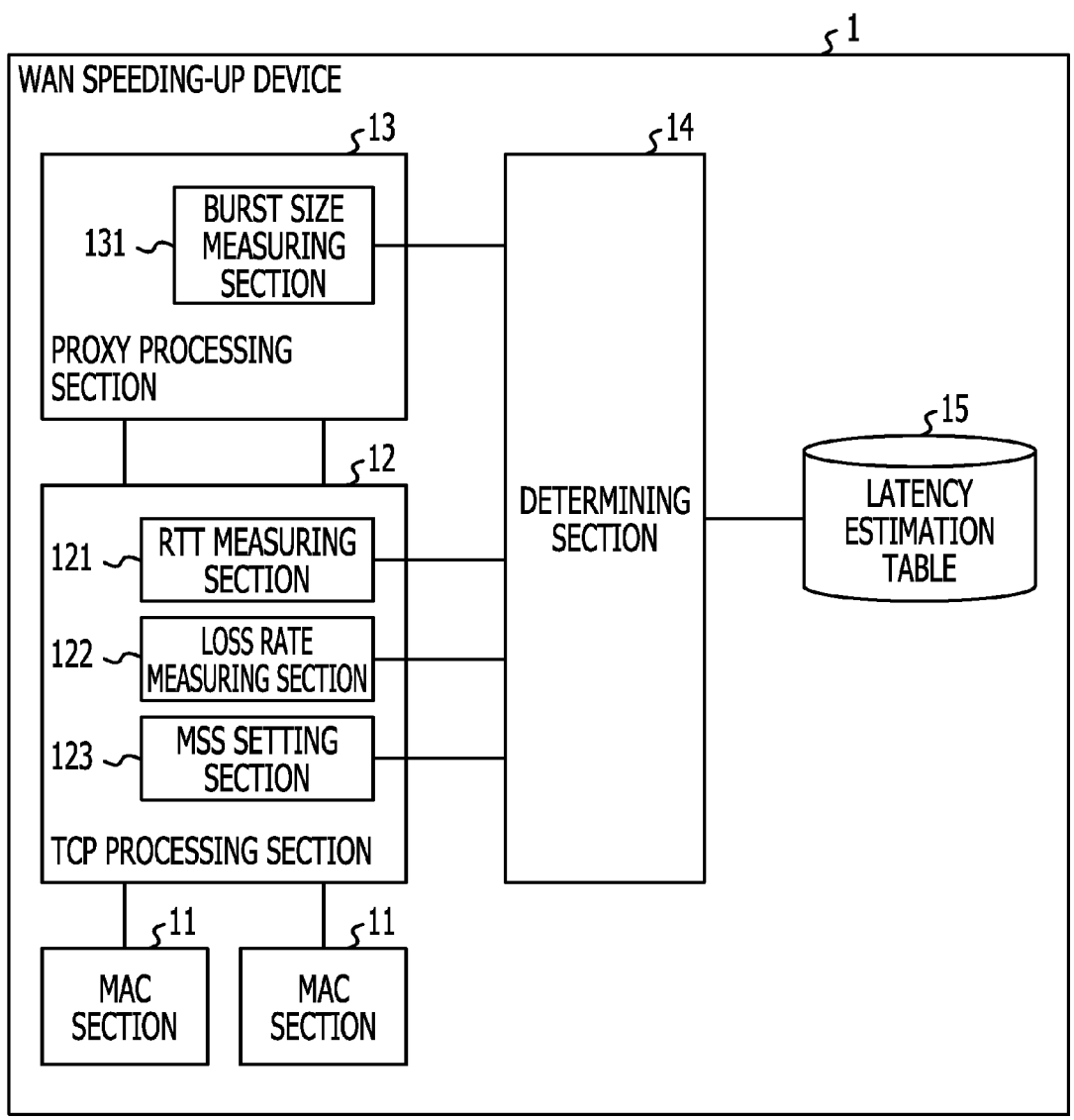
FIG. 4 depicts an example of a functional block of the WAN optimization device in the embodiment.

FIG. 4 is a diagram depicting an example of a functional block of the WAN optimization device 1 in the embodiment. The WAN optimization device 1 operates as a MAC section 11, a TCP processing section 12, a proxy processing section 13, and a determining section 14 as functional blocks. Moreover, the WAN optimization device 1 holds a latency estimation table 15 in the storage area of the main storage 102. Each functional block of the WAN optimization device 1 is implemented as a result of the processor 101 executing the communication program stored in the auxiliary storage 105 or implemented by hardware. For example, the TCP processing section 12, the proxy processing section 13, and the determining section 14 are implemented as a result of the processor 101 executing the communication program stored in the auxiliary storage 105. For example, the MAC section 11 corresponds to a PHY/MAC circuit included in the network interface 107. For example, examples of the hardware implementing each functional block of the WAN optimization device 1 include large scale integration (LSI) and field-programmable gate array (FPGA).

The MAC section 11 performs media access control (MAC) processing on a packet to be transmitted and received. In FIG. 4, a plurality of MAC sections 11 are depicted, but there may be one MAC section 11.

The TCP processing section 12 transmits and receives, by a TCP protocol, data that is transmitted and received by the communication application. The TCP processing section 12 includes an RTT measuring section 121, a loss rate measuring section 122, and an MSS setting section 123. The RTT measuring section 121 measures the RTT based on, for example, the time at which a TCP packet was transmitted and the arrival time of an ACK packet for the TCP packet. The loss rate measuring section 122 measures the packet loss rate based on the presence or absence of an ACK packet for the transmitted TCP packet.

The MSS setting section 123 changes the MSS of a TCP segment to be transmitted in accordance with an instruction from the determining section 14. The initial value and the maximum value of the MSS are 1460 bytes when the maximum transmission unit (MTU) is 1500 bytes, for example.

The proxy processing section 13 terminates a communication session of TCP between the terminal device 2 and the server 3 and generates a new communication session of the high-speed communication protocol between the proxy processing section 13 and the WAN optimization device 1 which the WAN optimization device 1 in which the proxy processing section 13 is provided faces. That is, the proxy processing section 13 performs protocol conversion. For example, the proxy processing section 13 rewrites the information of a header and pretends that the WAN optimization device 1 in which the proxy processing section 13 is provided is a client for the server 3 and a server for the terminal device 2.

The proxy processing section 13 includes a burst size measuring section 131. The burst size measuring section 131 measures an average burst size of burst data which is transmitted in a communication session.

The burst size measuring section 131 monitors the received packet and, if the interval between the reception of the latest received packet and the reception of the previous received packet is within a predetermined time, determines that these packets are packets belonging to the same burst data. If the interval between the reception of the latest received packet and the reception of the previous received packet is more than a predetermined time, the burst size measuring section 131 determines that one piece of burst data is ended and obtains the total segment length from the head packet to the last packet of the burst data. The total segment length of the packets included in the burst data is referred to as a burst size. The predetermined time based on which the end of one piece of burst data is determined may be, for example, a retransmission time out (RTO) which is a time-out period of TCP. The initial value of the RTO is about four times greater than the value of the RTT. Next, the burst size measuring section 131 obtains a moving average of the latest burst size of the burst data and the burst size which was measured earlier as an average burst size. Let an B with an overline be an average burst size and the measurement result of the latest burst size be $B_n$. Then, a moving average is expressed as expression (5) below.

$$\overline{B}_n = (1-\beta)\overline{B}_{n-1} + \beta B_n \quad (5)$$

Symbol $\beta$ is a weighting coefficient of $0<\beta<1$. Incidentally, the average burst size is not limited to an average burst size given by expression (5) and may be a simple average of the last N burst sizes.

Moreover, some applications transmit burst data in a previously set burst size. With such an application, the burst size measuring section 131 may distinguish an application from another application based on a port number in a TCP header and obtain, as an average burst size, a burst size previously set for the application. The burst size measuring section 131 is an example of a "measuring section".

The determining section 14 determines the presence or absence of a change in the RTT measured by the RTT measuring section 121, a change in the loss rate measured by the loss rate measuring section 122, and a change in the average burst size measured by the burst size measuring section 131. Hereinafter, the RTT, the loss rate, the average burst size are collectively referred to as "network parameters". The network parameters are also referred to as "communication indicators".

The determining section 14 obtains the MSS with which the latency of communication with the WAN optimization device which the WAN optimization device in which the determining section 14 is provided faces is lowered in the current network parameters by using the latency estimation table 15, which will be described later, in accordance with the values of the network parameters.

Latency is the time from when the WAN optimization device 1 transmits the first segment of burst data therefrom until when the WAN optimization device 1 receives an ACK for the last segment of the burst data from the other WAN optimization device 1 which the WAN optimization device 1 faces. Latency is defined by expression (6) below.

$$\text{Latency} = \frac{\text{Average burst size}}{\text{Average window size} \times MSS} \times RTT \qquad (6)$$

Figure 5:
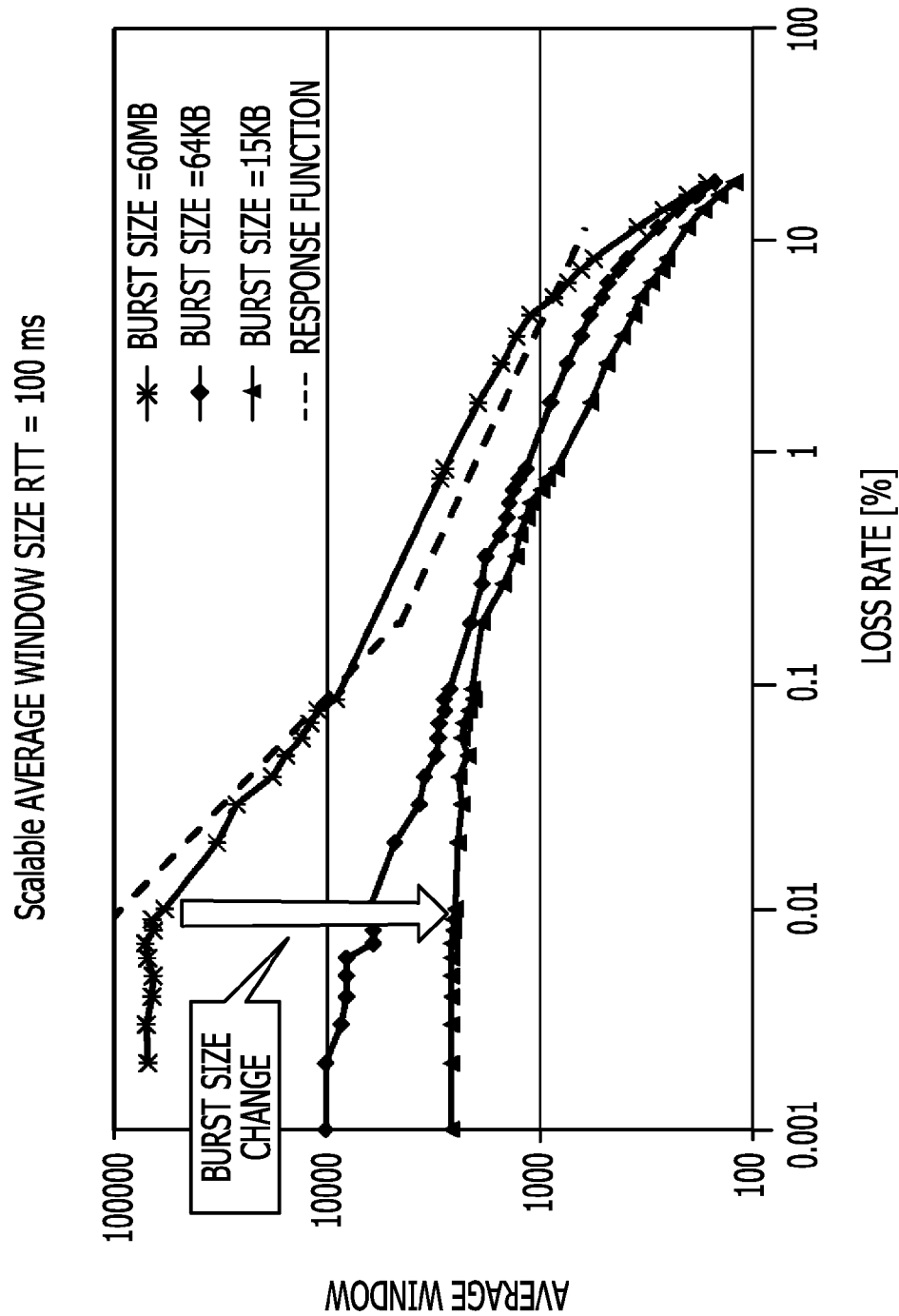
FIG. 5 depicts an example of the relationship between the loss rate and an average window when two-way communication is performed by using TCP Scalable.

FIG. 5 is a diagram depicting an example of the relationship between the loss rate and an average window when two-way communication is performed by using TCP Scalable. In FIG. 5, it is assumed that the RTT is 100 ms and there is no change in the RTT. In FIG. 5, examples in which the burst sizes are 15 Kbytes, 64 Kbytes, and 60 Mbytes are depicted. Moreover, a dashed line represents a theoretical value obtained when a burst size determined by an analytical solution called a response function is infinite.

The example depicted in FIG. 5 indicates that, the smaller the burst size, the smaller an average window size. Moreover, expression (6) indicates that the smaller an average window size, the higher the latency. Based on those described above, the determining section 14 sets the MSS in accordance with the average burst size measured by the burst size measuring section 131. Specifically, for example, when the average burst size changes to a smaller size, the determining section 14 sets the MSS to a lower value. By doing so, the determining section 14 suppresses a decrease in the average window size and performs control such that latency has a lower value.

Moreover, the example depicted in FIG. 5 indicates that the average window size becomes smaller than a value determined by the theoretical value as the burst size becomes smaller. Furthermore, the example depicted in FIG. 5 indicates that, when the burst size is greater than 60 Mbytes, the average window size is closer to the theoretical value. Therefore, when the average burst size measured by the burst size measuring section 131 is greater than 60 Mbytes, the determining section 14 sets the MSS to 1460 bytes which is the maximum value.

Figure 6:
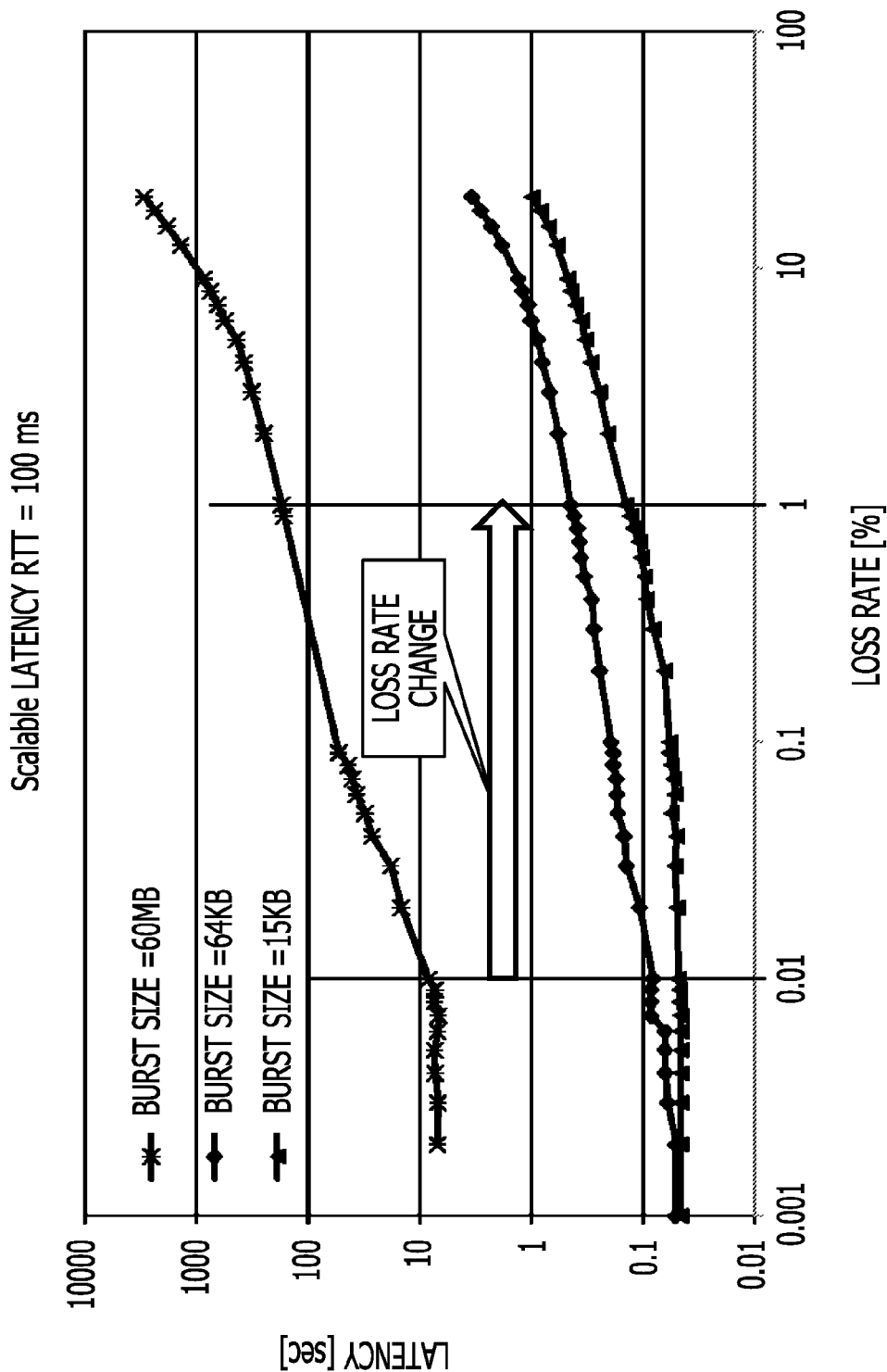
FIG. 6 depicts an example of the relationship between the loss rate and latency when two-way communication is performed by using TCP Scalable.

FIG. 6 is a diagram depicting an example of the relationship between the loss rate and latency when two-way communication is performed by using TCP Scalable. In FIG. 6, it is assumed that the RTT is 100 ms and there is no change in the RTT. In FIG. 6, examples in which the burst sizes are 15 Kbytes, 64 Kbytes, and 60 Mbytes are depicted.

Here, the example depicted in FIG. 5 indicates that the higher the loss rate, the smaller the average window size. Furthermore, expression (6) indicates that the smaller the average window size, the higher the latency. That is, the higher the loss rate, the higher the latency. Therefore, the example depicted in FIG. 6 indicates that, in any burst size, the higher the loss rate, the higher the latency.

Based on those described above, the determining section 14 determines the MSS in accordance with, in addition to the average burst size, the loss rate measured by the loss rate measuring section 122.

FIG. 7 is a diagram depicting an example of the relationship between the loss rate and latency when two-way communication is performed by using TCP Scalable and the burst size is 64 Kbytes. FIG. 8 is a diagram depicting an example of the relationship between the loss rate and latency when two-way communication is performed by using TCP Scalable and the burst size is 15 Kbytes. In FIGS. 7 and 8, an example in which the RTT is 100 ms and an example in which the RTT is 200 ms are respectively depicted.

Expression (6) indicates that the longer the RTT, the higher the latency. Therefore, FIGS. 7 and 8 indicate that, in any burst size and at any loss rate, latency when the RTT is 200 ms is higher than latency when the RTT is 100 ms. For example, in FIG. 8, when the burst size is 15 Kbytes, at a loss rate of 0.1%, latency when the RTT is 200 ms is about twice as high as latency when the RTT is 100 ms.

Therefore, the determining section 14 determines the MSS in accordance with, in addition to the average burst size and the packet loss rate, the RTT measured by the RTT measuring section 121.

FIG. 9 is an example of the latency estimation table 15. In the latency estimation table 15, latency estimated in accordance with the values of the average burst size, the loss rate, the RTT, and the MSS is stored. The unit of latency stored in the latency estimation table 15 depicted in FIG. 9 is second (s).

When the MSS is made smaller, the number of segments and the number of packets are increased due to data splitting, which results in an increase in overhead by a TCP/IP header. Therefore, a decrease in throughput due to an increase in overhead of the TCP/IP header caused as a result of the MSS becoming smaller is added to the value of latency stored in the latency estimation table 15.

The value of latency stored in the latency estimation table 15 may be, for example, an actual measured value by a simulation or the like performed in accordance with the values of the average burst size, the loss rate, the RTT, and the MSS or a theoretical value derived from a predetermined calculation formula.

Figure 10:
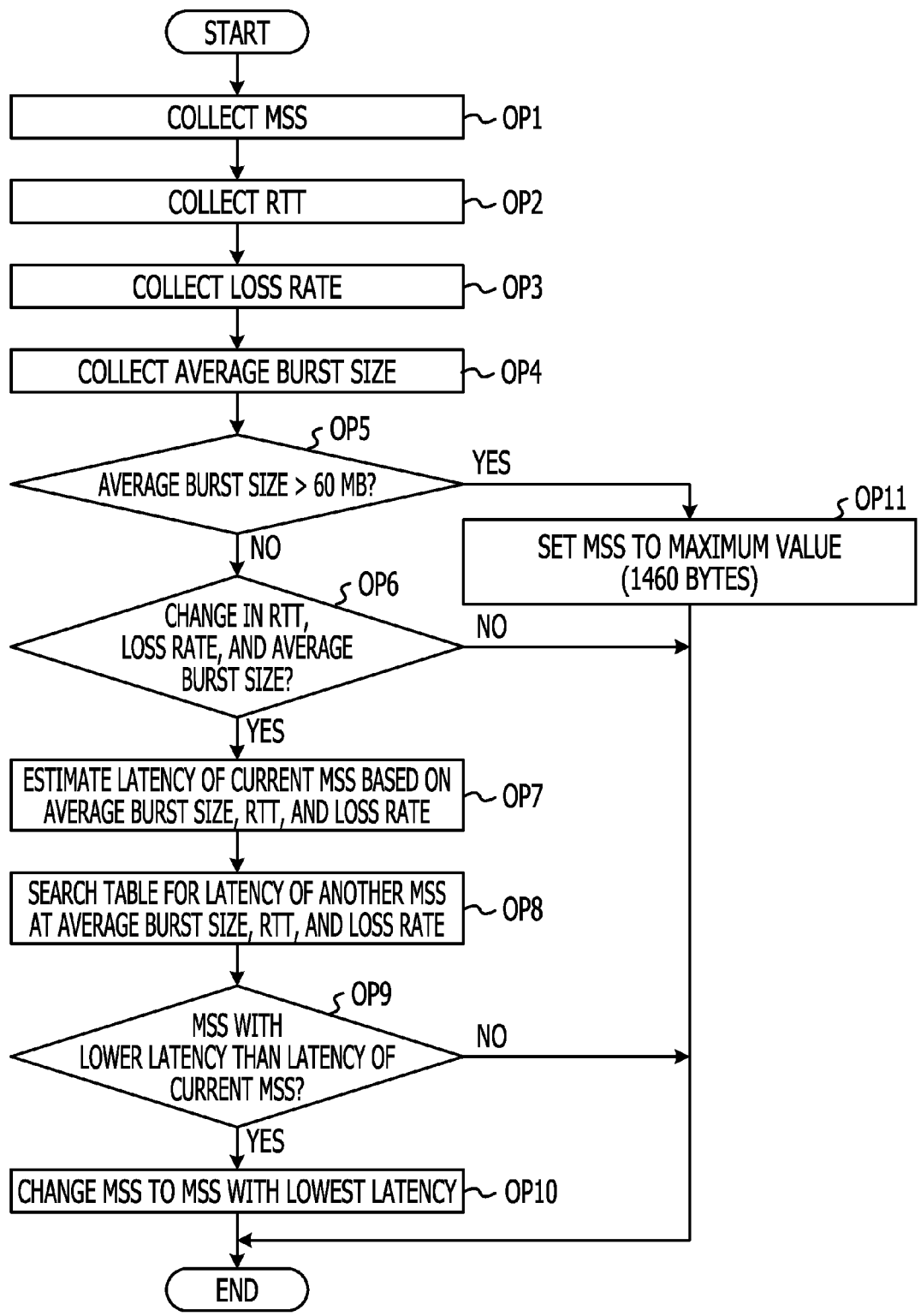
FIG. 10 depicts an example of a flowchart of processing of a determining section.

FIG. 10 is an example of a flowchart of processing of the determining section 14. The processing depicted in FIG. 10 is performed every time a packet is received on a TCP session-by-TCP session basis, the TCP session handled by the WAN optimization device 1, for example.

In OP1 to OP4, the determining section 14 collects the current MSS held by the MSS setting section 123, the RTT measured by the RTT measuring section 121, the loss rate measured by the loss rate measuring section 122, and the average burst size measured by the burst size measuring section. Then, the processing proceeds to OP5.

In OP5, the determining section 14 determines whether or not the average burst size is greater than 60 Mbytes. If the average burst size is greater than 60 Mbytes (OP5: Yes), since a difference between the average burst size and the theoretical value is small, the determining section 14 sets the MSS to 1460 bytes which is the maximum value (OP11). If the average burst size is smaller than or equal to 60 Mbytes (OP5: No), the processing proceeds to OP6.

In OP6, the determining section 14 determines whether or not there is a change in at least one of the collected RTT, loss rate, and average burst size. If there is a change in at least one of the RTT, the loss rate, and the average burst size (OP6: Yes), the processing proceeds to OP7. If there is no change in the RTT, the loss rate, and the average burst size (OP6: No), it is estimated that there is no change in latency and the processing depicted in FIG. 10 is ended without a change in the MSS. Incidentally, in OP6, a threshold value of the amount of change for each parameter may be set, and it may be determined that there is a change in the parameter when the amount of change is greater than the threshold value. Moreover, at the first execution of the processing depicted in FIG. 10, the processing is assumed to proceed to OP7.

In OP7, the determining section 14 refers to the latency estimation table 15 and estimates the latency of the current MSS based on the collected RTT, loss rate, average burst size. Next, in OP8, the determining section 14 searches the latency estimation table 15 for an estimated value of the latency of another MSS at the collected RTT, loss rate, and average burst size. Hereinafter, latency obtained from the latency estimation table 15 is an estimated value but is referred to simply as "latency" for the sake of convenience.

In OP9, the determining section 14 determines whether or not there is an MSS with lower latency than the latency of the current MSS among the retrieved latency. If there is an MSS with lower latency than the latency of the current MSS (OP9: Yes), the processing proceeds to OP10. If there is not an MSS with lower latency than the latency of the current MSS (OP9: No), since a prediction that latency would become lower is not made even when the MSS is changed, the processing depicted in FIG. 10 is ended without a change in the MSS.

In OP10, the determining section 14 changes the MSS to an MSS with the lowest latency among the retrieved latency. The determining section 14 notifies the MSS setting section 123 of the changed MSS. Then, the processing depicted in FIG. 10 is ended.

Incidentally, the flowchart depicted in FIG. 10 is an example, and the processing performed by the determining section 14 is not limited to the flowchart depicted in FIG. 10. For example, the order of the processing of collecting the network parameters from OP1 to OP4 may be changed.

<Specific Examples of Determination of MSS>corrected, DD.

SPECIFIC EXAMPLE 1

A Case in which the Average Burst Size has Changed

FIG. 11 is a diagram depicting an example of use of the latency estimation table 15 when the average burst size has changed. In FIG. 11, the same latency estimation table 15 as the latency estimation table 15 depicted in FIG. 9 is depicted.

First, the determining section 14 obtains an MSS of 1460 bytes (initial value), an average burst size of 15 Kbytes, an RTT of 100 ms, and a loss rate of 0.1% (OP1 to OP4). The determining section 14 obtains a latency $L_{MSS=1460}$ of 0.05 s from the latency estimation table 15 depicted in FIG. 11 (OP7).

Next, the determining section 14 obtains, from the latency estimation table 15 depicted in FIG. 11, a latency $L_{MSS=730}$ of 0.047 s and a latency $L_{MSS=360}$ of 0.045 s when the MSS is 730 bytes and the MSS is 360 bytes, respectively, when the average burst size is 15 Kbytes, the RTT is 100 ms, and the loss rate is 0.1% (OP8). A latency $L_{MSS=1460}$ of 0.05 s, a latency $L_{MSS=730}$ of 0.047 s, and a latency $L_{MSS=360}$ of 0.045 s when the average burst size is 15 Kbytes, the RTT is 100 ms, and the loss rate is 0.1% are made to stand out by being circled in FIG. 11.

The determining section 14 decides to change the MSS to 360 bytes because a latency $L_{MSS=360}$ of 0.045 s is the lowest among the retrieved latency (OP9: Yes, OP10).

Here, assume that the average burst size has changed to 64 Kbytes and there is no change in the RTT and the loss rate. In this case, since the average burst size has changed (OP6: Yes), the determining section 14 obtains a latency $L_{MSS=360}$ of 0.16722 s in the current MSS of 360 bytes when the average burst size is 64 Kbytes, the RTT is 100 ms, and the loss rate is 0.1% (OP7).

Next, the determining section 14 obtains, from the latency estimation table 15 depicted in FIG. 11, a latency $L_{MSS=1460}$ of 0.18 s and a latency $L_{MSS=730}$ of 0.139 s when the MSS is 1460 bytes and the MSS is 730 bytes, respectively, when the average burst size is 64 Kbytes, the RTT is 100 ms, and the loss rate is 0.1% (OP8). A latency $L_{MSS=1460}$ of 0.18 s, a latency $L_{MSS=730}$ of 0.139 s, and a latency $L_{MSS=360}$ of 0.16722 s when the average burst size is 64 Kbytes, the RTT is 100 ms, and the loss rate is 0.1% are made to stand out with squares put around these values in FIG. 11.

The determining section 14 decides to change the MSS to 730 bytes because a latency $L_{MSS=730}$ of 0.139 s is the lowest among the retrieved latency (OP9: Yes, OP10). Incidentally, a latency $L_{MSS=360}$ of 0.16722 s when the MSS is 360 bytes is a value greater than a latency $L_{MSS=730}$ of 0.139 s when the MSS is 730 bytes due to an increase in overhead of a TCP/IP header associated with an increase in the number of packets. Therefore, in this case, the MSS is changed to a greater value, that is, from 360 bytes to 730 bytes.

SPECIFIC EXAMPLE 2

A Case in which the Loss Rate has Changed

FIG. 12 is a diagram depicting an example of use of the latency estimation table 15 when the loss rate has changed. In FIG. 12, the latency estimation table 15 which is the same as the latency estimation table 15 depicted in FIG. 9 is depicted.

First, the determining section 14 obtains an MSS of 1460 bytes (initial value), an average burst size of 15 Kbytes, an RTT of 100 ms, and a loss rate of 1% (OP1 to OP4). The determining section 14 obtains a latency $L_{MSS=1460}$ of 0.142 s from the latency estimation table 15 depicted in FIG. 12 (OP7).

Next, the determining section 14 obtains, from the latency estimation table 15 depicted in FIG. 12, a latency $L_{MSS=730}$ of 0.109 s and a latency $L_{MSS=360}$ of 0.13 s when the MSS is 730 bytes and the MSS is 360 bytes, respectively, when the average burst size is 15 Kbytes, the RTT is 100 ms, and the loss rate is 1% (OP8). A latency $L_{MSS=1460}$ of 0.142 s, a latency $L_{MSS=730}$ of 0.109 s, and a latency $L_{MSS=360}$ of 0.13 s when the average burst size is 15 Kbytes, the RTT is 100 ms, and the loss rate is 1% are made to stand out by being circled in FIG. 12.

The determining section 14 decides to change the MSS to 730 bytes because a latency $L_{MSS=730}$ of 0.109 s is the lowest among the retrieved latency (OP9: Yes, OP10).

Here, assume that the loss rate has changed to 0.01% and there is no change in the average burst size and the loss rate. In this case, since the loss rate has changed (OP6: Yes), the determining section 14 obtains a latency $L_{MSS=730}$ of 0.043 s in the current MSS of 730 bytes when the average burst size is 15 Kbytes, the RTT is 100 ms, and the loss rate is 0.01% (OP7).

Next, the determining section 14 obtains, from the latency estimation table 15 depicted in FIG. 12, a latency $L_{MSS=1460}$ of 0.042 s and a latency $L_{MSS=360}$ of 0.044 s when the MSS is 1460 bytes and the MSS is 360 bytes, respectively, when the average burst size is 15 Kbytes, the RTT is 100 ms, and the loss rate is 0.01% (OP8). A latency $L_{MSS=1460}$ of 0.042 s, a latency $L_{MSS=730}$ of 0.043 s, and a latency $L_{MSS=360}$ of 0.044 s when the average burst size is 15 Kbytes, the RTT is 100 ms, and the loss rate is 0.01% are made to stand out with squares put around these values in FIG. 12.

The determining section 14 decides to change the MSS to 1460 bytes because a latency $L_{MSS=1460}$ of 0.042 s is the lowest among the retrieved latency (OP9: Yes, OP10). Incidentally, a latency $L_{MSS=730}$ of 0.043 s when the MSS is 730 bytes is a value greater than a latency $L_{MSS=1460}$ of 0.042 s when the MSS is 1460 bytes due to an increase in overhead of a TCP/IP header associated with an increase in the number of packets. Therefore, in this case, the MSS is changed to a greater value, that is, from 730 bytes to 1460 bytes.

SPECIFIC EXAMPLE 3

A Case in which the RTT has Changed

FIG. 13 is a diagram depicting an example of use of the latency estimation table 15 when the RTT has changed. In FIG. 13, the latency estimation table 15 which is the same as the latency estimation table 15 depicted in FIG. 9 is depicted. The RTT changes by, for example, a change in a wireless environment, a change in a routing path, or the movement of the server in a data center.

First, the determining section 14 obtains an MSS of 1460 bytes (initial value), an average burst size of 15 Kbytes, an RTT of 100 ms, and a loss rate of 0.1% (OP1 to OP4). The determining section 14 obtains an estimated value of a latency $L_{MSS=1460}$ of 0.05 s from the latency estimation table 15 depicted in FIG. 13 (OP7).

Next, the determining section 14 obtains, from the latency estimation table 15 depicted in FIG. 13, a latency $L_{MSS=730}$ of 0.047 s and a latency $L_{MSS=360}$ of 0.045 s when the MSS is 730 bytes and the MSS is 360 bytes, respectively, when the average burst size is 15 Kbytes, the RTT is 100 ms, and the loss rate is 0.1% (OP8). A latency $L_{MSS=1460}$ of 0.05 s, a latency $L_{MSS=730}$ of 0.047 s, and a latency $L_{MSS=360}$ of 0.045 s when the average burst size is 15 Kbytes, the RTT is 100 ms, and the loss rate is 0.1% are made to stand out by being circled in FIG. 13.

The determining section 14 decides to change the MSS to 360 bytes because a latency $L_{MSS=360}$ of 0.045 s is the lowest among the retrieved latency (OP9: Yes, OP10).

Here, assume that the RTT has changed to 200 ms and there is no change in the average burst size and the loss rate. In this case, since the RTT has changed (OP6: Yes), the determining section 14 obtains a latency $L_{MSS=360}$ of 0.23 s in the current MSS of 360 bytes when the average burst size is 15 Kbytes, the RTT is 200 ms, and the loss rate is 0.1% (OP7).

Next, the determining section 14 obtains, from the latency estimation table 15 depicted in FIG. 13, a latency $L_{MSS=1460}$ of 0.29 s and a latency $L_{MSS=730}$ of 0.21 s when the MSS is 1460 bytes and the MSS is 730 bytes, respectively, when the average burst size is 15 Kbytes, the RTT is 200 ms, and the loss rate is 0.1% (OP8). A latency $L_{MSS=1460}$ of 0.29 s, a latency $L_{MSS=730}$ of 0.21 s, a latency $L_{MSS=360}$ of 0.23 s when the average burst size is 15 Kbytes, the RTT is 200 ms, and the loss rate is 0.1% are made to stand out with squares put around these values in FIG. 13.

The determining section 14 decides to change the MSS to 730 bytes because a latency $L_{MSS=730}$ of 0.21 s is the lowest among the retrieved latency (OP9: Yes, OP10). Incidentally, a latency $L_{MSS=360}$ of 0.23 s when the MSS is 360 bytes is a value greater than a latency $L_{MSS=730}$ of 0.21 s when the MSS is 730 bytes due to an increase in overhead of a TCP/IP header associated with an increase in the number of packets. Therefore, in this case, the MSS is changed to a greater value, that is, from 360 bytes to 730 bytes.

<Example of Operation>

Figure 14:
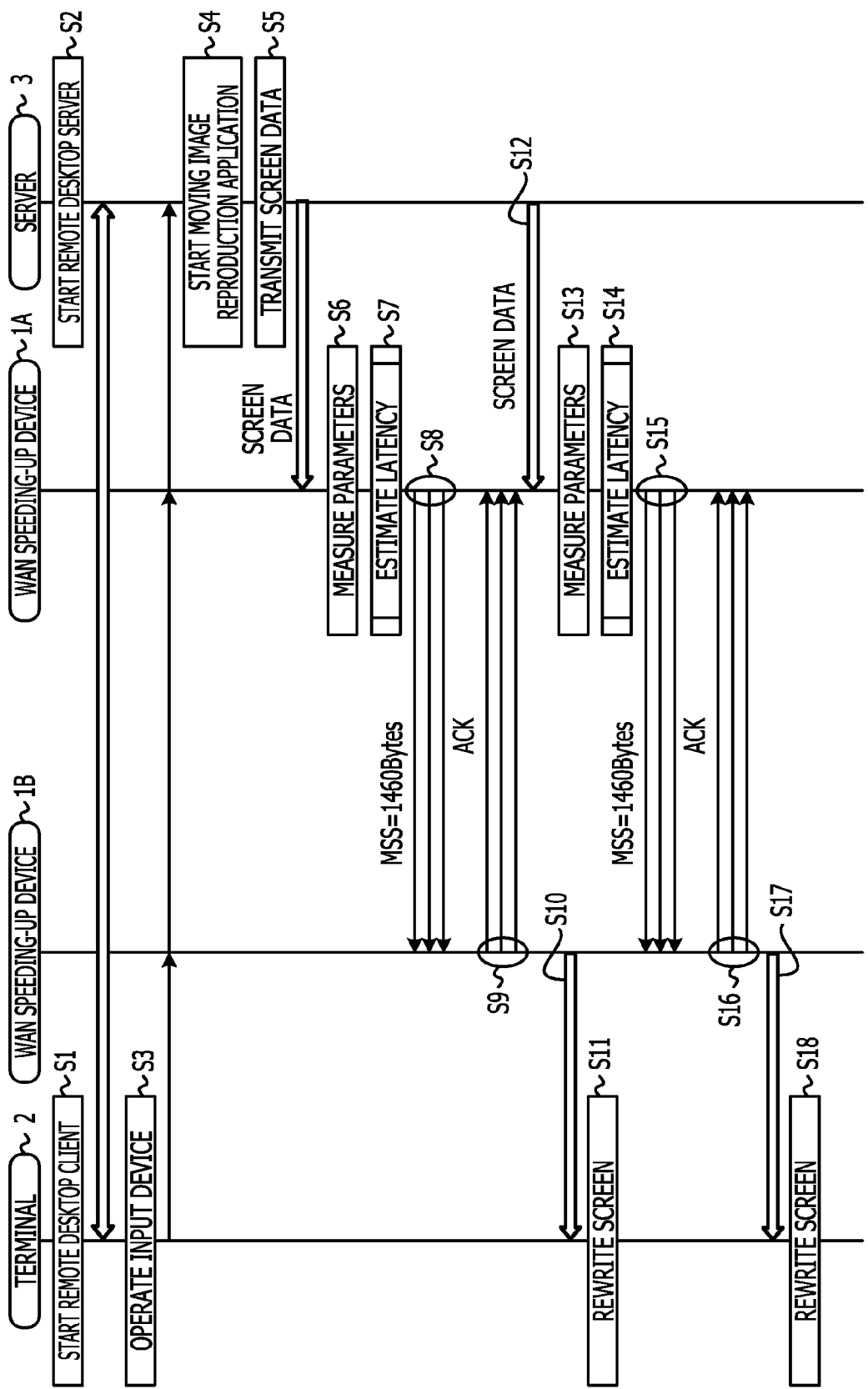
FIG. 14 depicts an example of a sequence when a terminal device using remote desktop reproduces moving images on a desktop.
Figure 15:
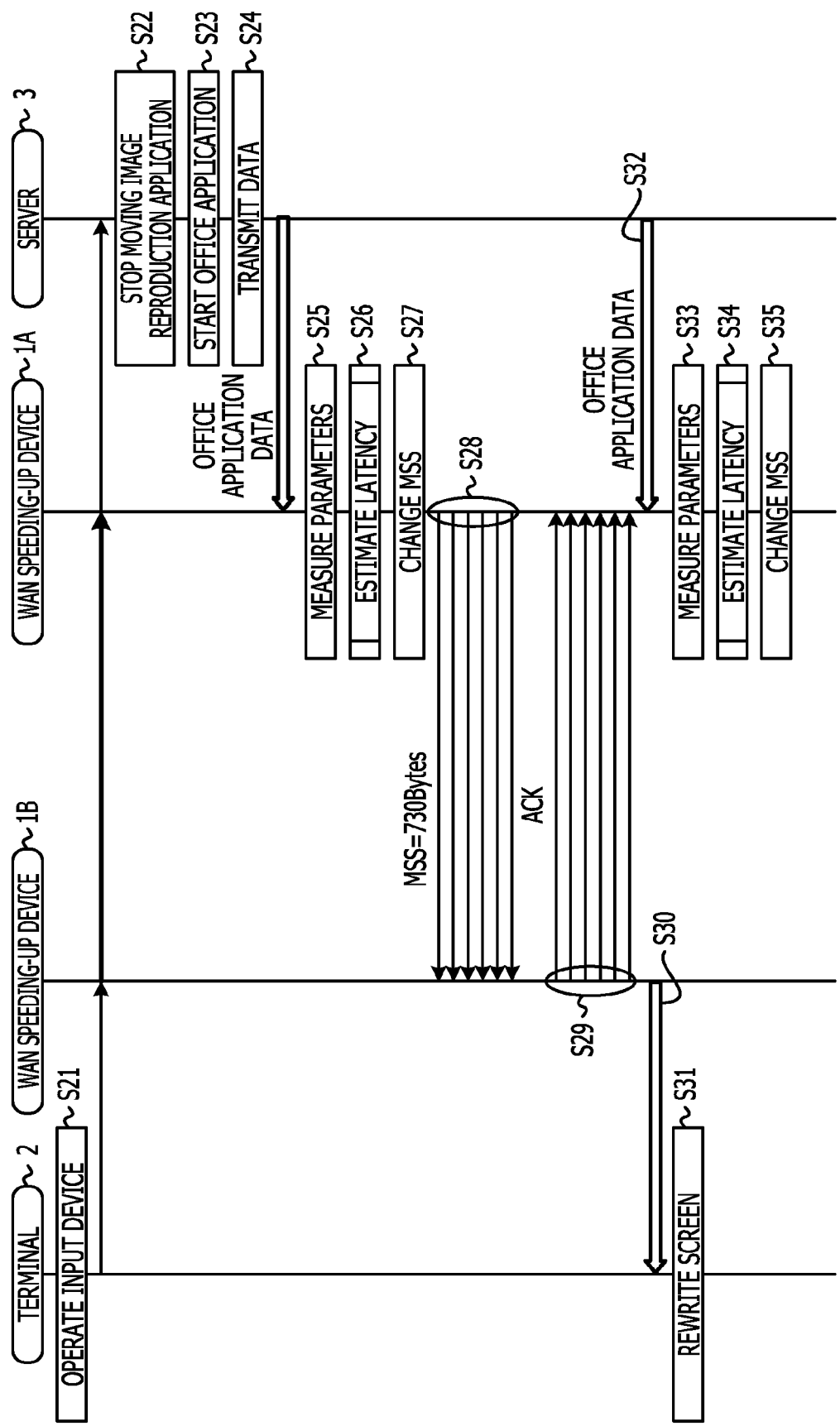
FIG. 15 depicts an example of a case in which the user of a terminal device ends moving image reproduction and then starts an office application on a screen of remote desktop.

FIGS. 14 and 15 are examples of a sequence diagram when communication is performed between the terminal device 2 and the server 3 by remote desktop in the communication system of FIG. 2. FIG. 14 is a diagram depicting an example of a sequence when the terminal device 2 using remote desktop reproduces moving images on a desktop.

The terminal device 2 and the server 3 start remote desktop (S1, S2). At this time, between remote desktop server (the server 3) and client (the terminal device 2), a communication sequence for connection is executed.

When remote desktop connection is established, on a display of the terminal device 2, a desktop screen of the server 3 is displayed. As a result of the user of the terminal device 2 operating the screen by using a mouse, a keyboard, and the like, a screen operation command is transmitted to the server 3 (S3).

It is assumed that, in S3, the user of the terminal device 2 clicks an icon of an application of moving image reproduction by using the mouse. At this time, communication packets containing the command are converted into a high-speed communication protocol from standard TCP, for example, via the WAN optimization devices 1A and 1B and is then transmitted to the server 3. Upon receiving this command, the server 3 starts a moving image reproduction application (S4).

The server 3 transmits screen data of the moving images to the terminal device 2 via remote desktop (S5). At this time, the server 3 transmits the screen data to the WAN optimization device 1A by using standard TCP, for example.

The WAN optimization device 1A receives this screen data. The WAN optimization device 1A measures the network parameters, such as the burst size, the loss rate, and the RTT, of the received data (S6). Next, the WAN optimization device 1A performs latency estimation processing depicted in FIG. 11 (S7). It is assumed that, during reproduction of the moving images, the burst size is large and the MSS is set to 1460 bytes which is the maximum value. The WAN optimization device 1A performs protocol conversion and transmits the packets with a MSS of 1460 bytes by using the high-speed communication protocol (S8).

The WAN optimization device 1B receives these packets by using the high-speed communication protocol and transmits ACKs for these packets to the WAN optimization device 1A (S9). Furthermore, the WAN optimization device 1B transmits the received data to the terminal device 2 by using standard TCP (S10). Upon receiving this data, the terminal device 2 updates a display screen of the display (S11).

The server 3 transmits the screens of the moving images to the terminal device 2 one after another (S12). Then, processing similar to the processing performed in S5 to S11 is performed in each device (S12 to S18).

FIG. 15 is an example of a case in which the user of the terminal device 2 ends moving image reproduction and then starts an office application on a screen of remote desktop. The office application is a word processing program, spreadsheet software, and so forth.

The user of the terminal device 2 operates the screen by using an input device such as the mouse, and the terminal device 2 transmits a command to the server 3 (S21). Communication packets containing the command are subjected to protocol conversion from standard TCP to the high-speed communication protocol by the WAN optimization device 1B and are transmitted to the WAN optimization device 1A. Furthermore, the communication packets are subjected to protocol conversion from the high-speed communication protocol to standard TCP by the WAN optimization device 1A and are transmitted to the server 3.

The server 3 stops the moving image reproduction application in accordance with the received command and starts the office application (S22, S23). The server 3 transmits screen data associated with the start of the office application to the terminal device 2 (S24).

The WAN optimization device 1A receives this screen data. The WAN optimization device 1A measures the network parameters, such as the burst size, the loss rate, and the RTT, of the received data (S25). The burst size of the office application is generally smaller than the burst size of the moving image reproduction application, and, here, it is assumed that the average burst size thus measured is 15 Kbytes.

Next, the WAN optimization device 1A performs latency estimation processing depicted in FIG. 11 (S26). Since the average burst size has changed to 15 Kbytes, the WAN optimization device 1A estimates the current latency from the latency estimation table 15 and selects the MSS with which latency becomes lower (S27). Here, it is assumed that the MSS is set to 730 bytes. The WAN optimization device 1A performs protocol conversion and transmits the packets with the MSS of 730 bytes by using the high-speed communication protocol (S28).

The WAN optimization device 1B receives these packets by using the high-speed communication protocol and transmits ACKs for these packets to the WAN optimization device 1A (S29). Furthermore, the WAN optimization device 1B transmits the received data to the terminal device 2 by using standard TCP (S30). Upon receiving this data, the terminal device 2 updates the display screen of the display (S31).

After that, the server 3 transmits the screen data one after another to the terminal device 2, and processing similar to the processing performed in S24 to S31 is performed in each device (S32 to S35).

In the example depicted in FIG. 15, as a result of the MSS being changed from 1460 bytes to 730 bytes with a change in the average burst size, the number of segments doubles. This makes more ACKs return to the WAN optimization device 1A, and the WAN optimization device 1A is allowed to enlarge the congestion window more quickly.

Effect of the Embodiment

Figure 16:
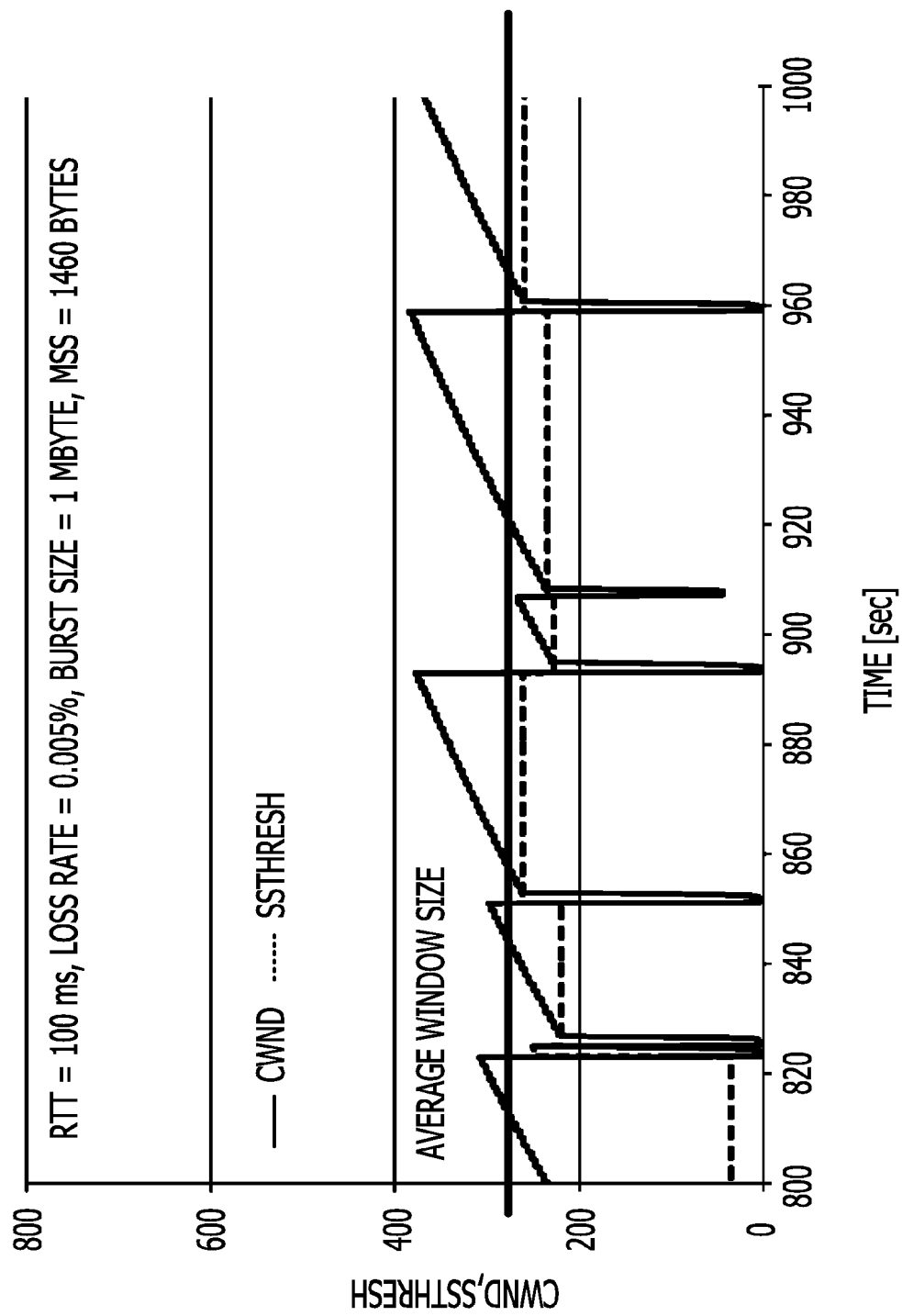
FIG. 16 depicts an example of the simulation result of latency of burst data when the MSS is fixed to 1460 bytes.
Figure 17:
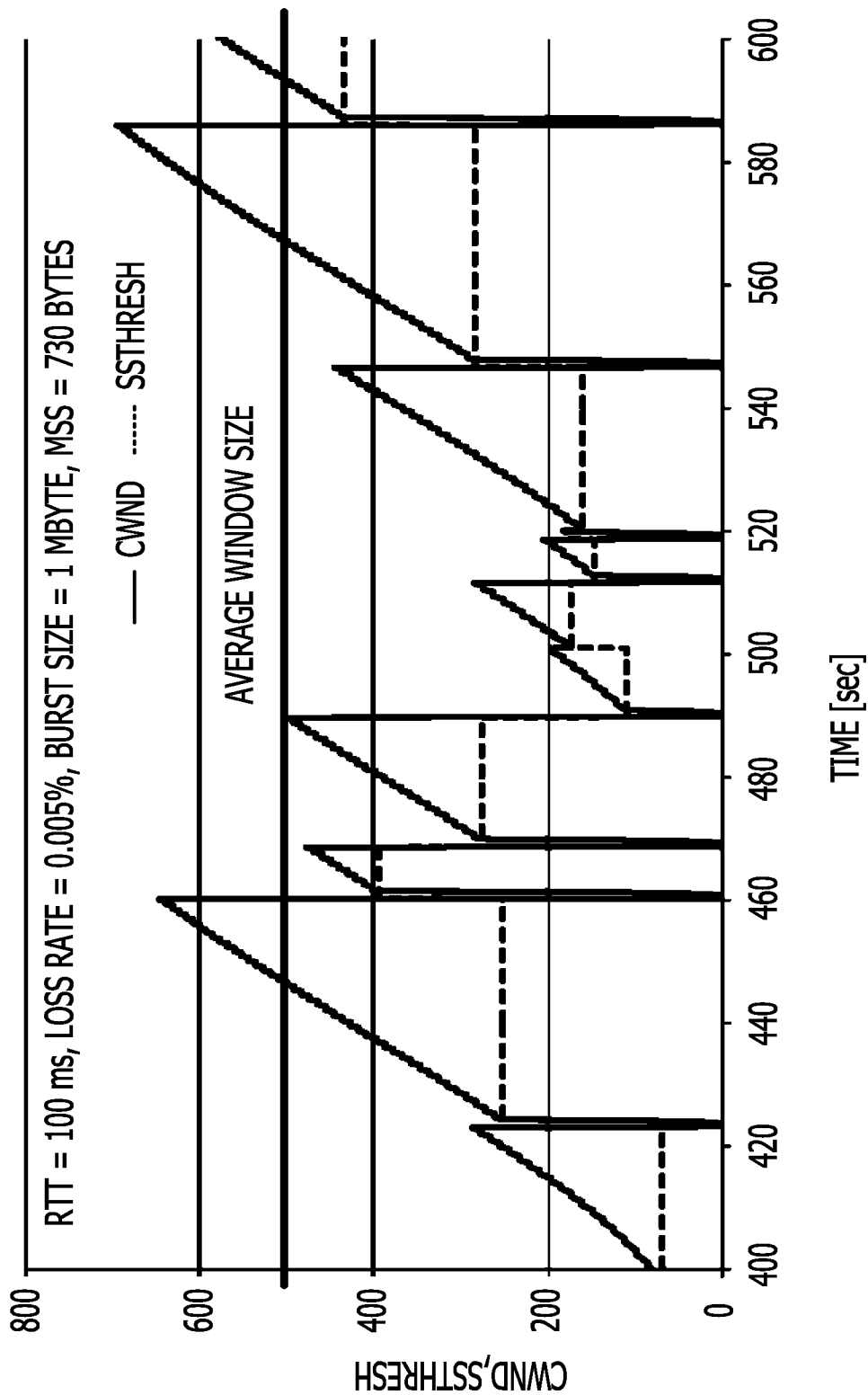
FIG. 17 depicts an example of the simulation result of latency of burst data when the MSS is changed to 730 bytes by the WAN optimization device of the embodiment.

FIG. 16 is a diagram of an example of the simulation result of latency of burst data when the MSS is fixed to 1460 bytes. FIG. 17 is a diagram of an example of the simulation result of latency of burst data when the MSS is changed to 730 bytes by the WAN optimization device 1 of the embodiment. In FIGS. 16 and 17, all the parameters except for the MSS are the same and the RTT is 100 ms, the loss rate is 0.005%, and the burst size is 1 Mbyte.

When the MSS is 1460 bytes as depicted in FIG. 16, 1 Mbyte of burst data corresponds to 684 packets. Moreover, the number of packets (the average window size) which are allowed to be transmitted per RTT are assumed to be about 220. Therefore, when the MSS is 1460 bytes, the time to transmit 1 Mbyte of burst data is about 3.11 RTT.

On the other hand, when the MSS is 730 bytes as depicted in FIG. 17, 1 Mbyte of burst data corresponds to 1369 packets. Moreover, the number of packets (the average window size) which are allowed to be transmitted per RTT is about 530. Therefore, when the MSS is 730 bytes, the time to transmit 1 Mbyte of burst data is about 2.5 RTT. This indicates that latency becomes higher as compared to when the MSS is 1460 bytes.

Therefore, according to the embodiment, by measuring the network parameters and dynamically changing the MSS in such a way that estimated latency becomes lower, the window size enlarges more quickly also in burst transmission. As a result of the window size enlarging more quickly, it is possible to increase an average throughput and lower latency.

Modified Example

In the embodiment, latency is estimated based on the network parameters, and the MSS is changed in such a way that the estimated value of latency becomes lower. In addition to this, for example, the value of a rise coefficient α in expression 1 and expression 2 may be changed. By changing the value of a rise coefficient α to a higher value, it is possible to increase the amount of change in window size per ACK and allow the congestion window to enlarge more easily. By changing the value of a rise coefficient α when, for example, latency does not become lower even by reducing the MSS due to overhead of a TCP/IP header, it is possible to make latency much lower.

Moreover, in addition to change of the MSS, for example, the WAN optimization device 1A in the system of FIG. 2 may disable the TCP Delayed ACK function of the WAN optimization device 1B by, for example, transmitting an instruction to the WAN optimization device 1B which the WAN optimization device 1A faces, the WAN optimization device 1B that receives a packet by using the high-speed transfer protocol. The TCP Delayed ACK function is the function of waiting for transmission of an ACK until a TCP stack of an OS becomes a rather large amount of data. This is because, if the TCP Delayed ACK function is enabled, an ACK from the WAN optimization device 1B is delayed, which may result in a reduction of the rate of enlargement of the congestion window.

Moreover, in the embodiment, the WAN optimization device 1 estimates latency by using the latency estimation table 15. Instead, the WAN optimization device 1 may estimate latency by using a predetermined function or graph for estimating latency, for example.

Furthermore, in the embodiment, the WAN optimization device 1 estimates latency from the measured values of the network parameters and selects the MSS with which latency becomes lower. Instead, the WAN optimization device 1 may estimate latency in the current MSS and, if this estimated value is greater than a threshold value which is set in advance based on a theoretical value obtained by a response function, for example, change the MSS.

Moreover, in the embodiment, as the network parameters, the burst size, the loss rate, and the RTT are measured, and latency is estimated by using the measured values. The network parameters used for estimation of latency are not limited to these network parameters, and other parameters related to a change in latency may be used.

Furthermore, in the embodiment, a case in which TCP Scalable is used between the WAN optimization device 1A and the WAN optimization device 1B as a high-speed communication protocol has been described. However, the embodiment is not limited thereto, and the WAN optimization device 1 of the embodiment is applicable to communication using a communication protocol adopting an algorithm by which a congestion window is enlarged in accordance with the number of ACKs, such as other TCP based high-speed communication protocols and a UDP based high-speed communication protocol.

Moreover, in the embodiment, the WAN optimization device has been described. However, the embodiment is not limited to the WAN optimization device, and processing similar to the processing of the WAN optimization device of the embodiment is applicable to communication devices that perform communication by using a high-speed communication protocol, such as a dedicated computer such as a server, a general-purpose computer such as a PC, and a relaying apparatus such as a router.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A communication device comprising:
a memory configured to store a program; and
a processor coupled to the memory, and, based on the program, configured to:
transmit a plurality of first packets to another communication device,
receive a plurality of acknowledgments each of which indicates the another communication device receives each of the plurality of the first packets,
count a number of the received acknowledgments,
calculate a packet loss rate based on a number of the transmitted first packets and on the number of the received acknowledgments,
determine a number of second packets based on the number of the received acknowledgments,
determine a length of a communication segment based on the packet loss rate, the communication segment being included in each of the second packets, and
transmit the second packets to the another communication device.

2. The communication device according to claim 1, wherein the processor is configured to measure a length of time between a first time point and a second time point, the first time point corresponds to a time point when a certain packet included in the plurality of the first packets is transmitted and the second time point corresponding to a time point when the acknowledgement for the certain packet is received, and
the communication segment length is determined, based on the length of time between a first time point and a second time point.

3. The communication device according to claim 2, wherein the processor is configured to calculate an average value of total data length of the communication segments included in the plurality of first packets for measuring the length of time between a first time point and a second time point.

4. The communication device according to claim 3, wherein the processor is configured to change the length of the communication segment to a lower value when the average value of the total data length is reduced.

5. The communication device according to claim 1, wherein the processor is configured to
transmit each of the plurality of first packets and the second packets in a burst mode.

6. The communication device according to claim 2, wherein the processor is configured to
store an information indicating a relationship between the packet loss rate and the length of the communication segment, and
determine the length of the communication segment based on the stored information and the calculated packet loss rate.

7. A communication method comprising:
transmitting a plurality of first packets to a communication device,
receiving a plurality of acknowledgments each of which indicates the communication device receives each of the plurality of the first packets,
counting a number of the received acknowledgments,
calculating a packet loss rate based on a number of the transmitted first packets and on the number of the received acknowledgments,
determining a number of second packets based on the number of the received acknowledgments,
determining a length of a communication segment based on the packet loss rate, the communication segment being included in each of the second packets, and
transmitting the second packets to the communication device.

8. A non-transitory computer-readable recording medium having stored therein a program for causing a communication device to execute:
transmitting a plurality of first packets to another communication device,
receiving a plurality of acknowledgments each of which indicates the another communication device receives each of the plurality of the first packets,
counting a number of the received acknowledgments,
calculating a packet loss rate based on a number of the transmitted first packets and on the number of the received acknowledgments,
determining a number of second packets based on the number of the received acknowledgments,
determining a length of a communication segment based on the packet loss rate, the communication segment being included in each of the second packets, and
transmitting the second packets to the another communication device.

* * * * *